United States Patent
Rozenbaum et al.

(10) Patent No.: US 12,124,488 B1
(45) Date of Patent: Oct. 22, 2024

(54) EDGE DEVICE FACILITY TO SELECTIVELY LOCATE MISSING CHAT MESSAGES

(71) Applicant: INTERNATIONAL BUSINESS MACHINES CORPORATION, Armonk, NY (US)

(72) Inventors: Nir Rozenbaum, Yoqneam Illit (IL); Nili Guy, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/334,420

(22) Filed: Jun. 14, 2023

(51) Int. Cl.
*G06F 16/33* (2019.01)
*H04L 51/04* (2022.01)

(52) U.S. Cl.
CPC ............ *G06F 16/334* (2019.01); *H04L 51/04* (2013.01)

(58) Field of Classification Search
CPC ........ G06F 16/334; G06F 11/14; H04L 51/04; H04L 51/216
See application file for complete search history.

(56) References Cited

U.S. PATENT DOCUMENTS

| | | | |
|---|---|---|---|
| 8,949,359 B2 | 2/2015 | Rasmussen et al. | |
| 9,536,227 B2 | 1/2017 | Nalliah et al. | |
| 2013/0151636 A1* | 6/2013 | Majeti | H04L 51/18 709/206 |
| 2013/0339477 A1* | 12/2013 | Majeti | H04L 67/02 709/217 |
| 2017/0012950 A1* | 1/2017 | Kim | H04W 4/12 |
| 2018/0019981 A1* | 1/2018 | Leavy | H04L 51/04 |
| 2022/0167209 A1 | 5/2022 | Baek | |

FOREIGN PATENT DOCUMENTS

| | | |
|---|---|---|
| CN | 107332974 A | 11/2017 |
| CN | 110166346 A | 8/2019 |
| CN | 110417664 A | 11/2019 |

OTHER PUBLICATIONS

Wikipedia contributors, "History of cryptography," Wikipedia, The Free Encyclopedia, https://en.wikipedia.org/w/index.php?title=History_of_cryptography&oldid=1225211790 (accessed May 28, 2024). (Year: 2024).*

(Continued)

*Primary Examiner* — William Spieler
(74) *Attorney, Agent, or Firm* — Tihon Poltavets, Esq; Kevin P. Radigan, Esq.; Heslin Rothenberg Farley & Mesiti P.C.

(57) ABSTRACT

Selective locating of missing chat messages for an edge device is provided. The process includes sending a locate chat message request from a user's edge device to at least one other edge device of at least one other participant in a chat with the user via an end-to-end encryption messaging system. The locate chat message request identifies at least one search parameter for at least one missing chat message of the chat on the edge device. The process further includes, based on sending the locate chat message request, receiving at the edge device from the at least one other edge device, the at least one missing chat message of the chat identified via the at least one search parameter.

20 Claims, 24 Drawing Sheets

(56) References Cited

OTHER PUBLICATIONS

Aaron, Jenefey, "WhatsApp Trick: How to Restore Deleted WhatsApp Messages Without Backup", Tenorshare, Updated Online Apr. 19, 2023, at: https://www.tenorshare.net/android-recovery/recover-deleted-whatsapp-messages-on-android-without-backup (10 pages).
International Search Report for PCT Application No. 2024/054367 mailed Aug. 13, 2024. 12 pages.

* cited by examiner

```
message: {
    metadata:
        msg_id: 932c30b9-e6fd-492a-8205-c123cb0bd1a9
        sent_by: {user_id}
        sent_at: {UTC timestamp}
    data:
bytes:   aGkgd2hhdCdzIHVwPwo=
type:    text (audio/image/video)
```

FIG. 4B

```
restore_message: {
   metadata:
      msg_id: 932c30b9-e6fd-492a-8205-c123cb0bd1a9
      sent_by: {user_id}
      sent_at: {UTC timestamp}
   data:
      start_from: {
         msg_id: {unique msg_id}
         timestamp: {utc timestamp}
      }
      pagination: {
         page_size: {unsigned interger}
         direction: {forward/backward} // if receiver should send next/previous "X" messages
      }
}
```

FIG. 5B

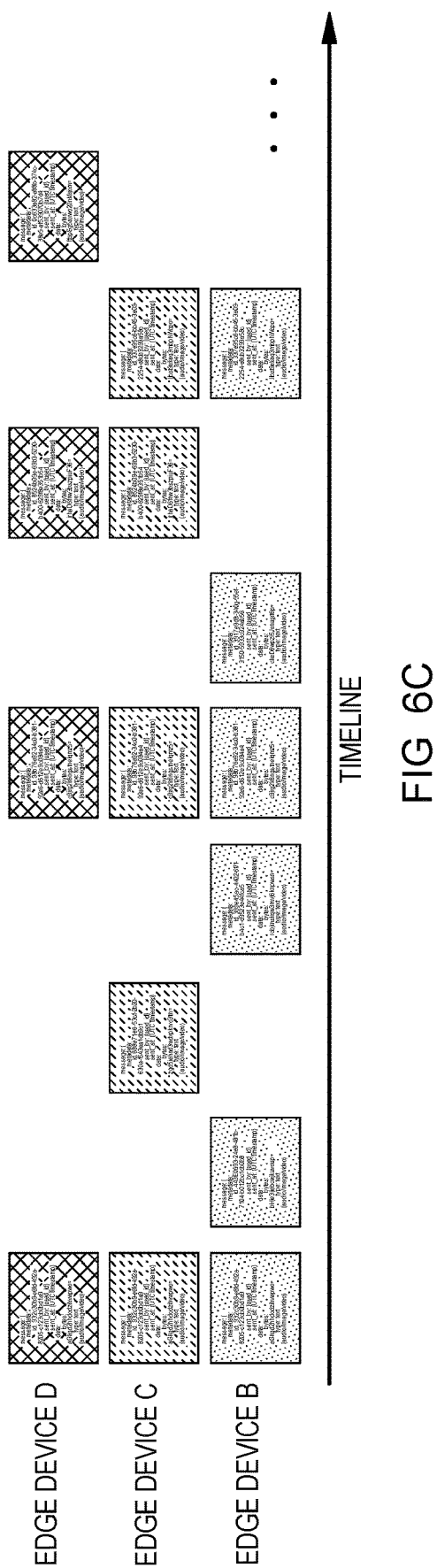

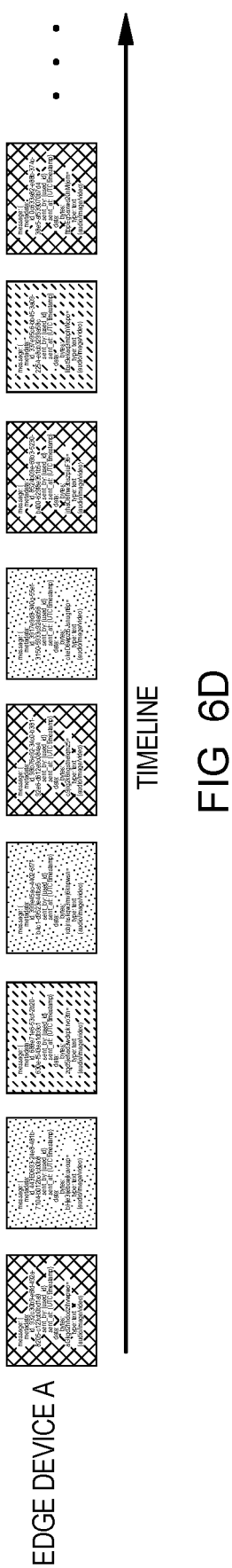

```
search_message: {
   metadata:
      msg_id: 932c30b9-e6fd-492a-8205-c123cb0bd1a9
      sent_by: {user_id}
      sent_at: {UTC timestamp}
   data:
      search_term: {text}
      start_from: {
         msg_id: {unique msg_id}
         timestamp: {UTC timestamp}
      }
      pagination: {
         page_size: {unsigned interger}
         direction: {forward/backward} // if receiver should search next/previous "X" messages
      }
}
```

FIG. 7B

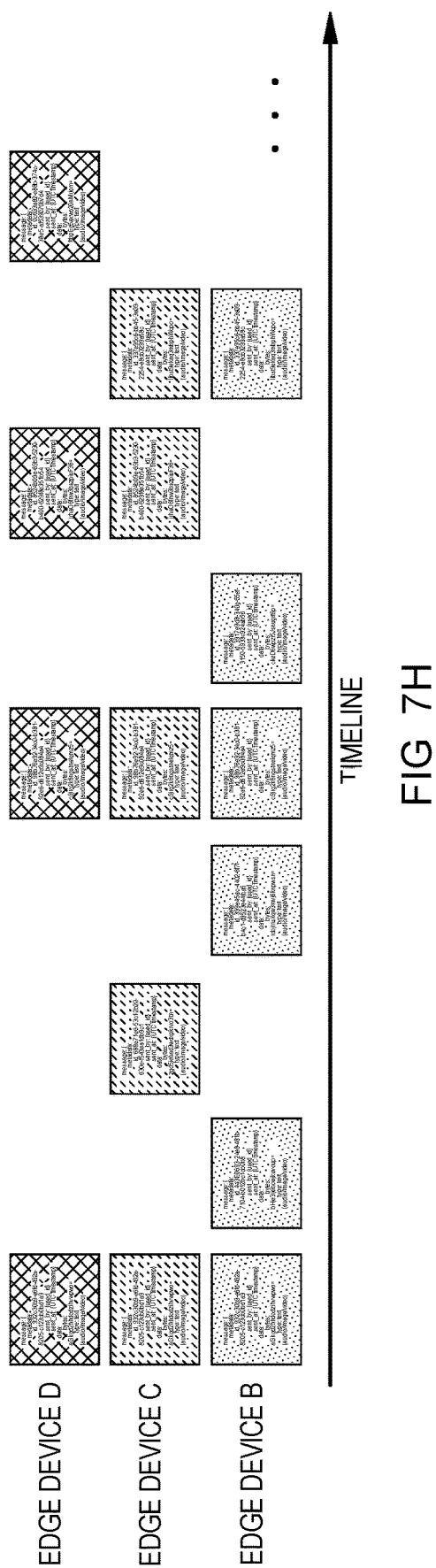

EDGE DEVICE FACILITY TO SELECTIVELY LOCATE MISSING CHAT MESSAGES

BACKGROUND

One or more aspects relate, in general, to facilitating processing within a computing environment, and more particularly, to facilitating selective locating of one or more missing chat messages for a user's edge device, where the one or more missing chat messages are part of a message chat using a messaging system with end-to-end encryption.

Messaging systems provide channels or pipelines of communication between messaging applications executing on different user edge devices, including the sending and receiving of chat messages. A variety of messaging systems or services exist, including instant messaging, such as via the Internet. Instant messaging technology is a type of online chat that allows real-time message transmission over the Internet, or another computer network. Certain messaging applications employ end-to-end encryption and store messages via local-based, edge device storage only, that is, without any sever storage, such as cloud-based sever storage of messages.

SUMMARY

Shortcomings of the prior art are overcome, and additional advantages are provided herein through the provision of a computer-implemented method of facilitating processing within a computing environment. The computer-implemented method includes sending a locate chat message request from a user's edge device to at least one other edge device of at least one other participant in a chat with the user via an end-to-end encryption messaging system. The locate chat message request identifies at least one search parameter for the at least one missing chat message of the chat on the edge device. The computer-implemented method further includes, based on sending the locate chat message request, receiving at the edge device from the at least one other edge device, the at least one missing chat message of the chat identified via the at least one search parameter. Advantageously, improved processing within a computing environment is provided. In particular, a computer-implemented method is provided to facilitate locating for an edge device one or more missing chat messages of a chat, where the chat is via an end-to-end encryption messaging system.

In one or more embodiments, the locate chat message request includes a chat message restore request, with the at least one missing chat message identified via the at least one search parameter being at least one missing chat message of the chat to be restored on the edge device. In one embodiment, the at least one search parameter is at least one metadata attribute of the at least one missing chat message. In one or more embodiments, a metadata attribute of the at least one metadata attribute is selected from the group consisting of: a message identifier of the at least one missing chat message, and a message timestamp of the at least one missing chat message. Advantageously, an edge device facility is provided to selectively restore at the edge device at least one missing chat message of a chat via the end-to-end encryption messaging system. With the at least one search parameter, the at least one missing chat message is located on the at least one other edge device and returned to the user's edge device missing the chat message. With the at least one search parameter being at least one metadata attribute of the missing chat message, selective locating and restoring of the at least one missing chat message is provided.

In one or more embodiments, the chat message restore request further identifies a pagination parameter, where the pagination parameter identifies a maximum number of missing chat messages to be received based on the chat message restore request. In one embodiment, the receiving includes receiving at the edge device from the at least one other edge device a maximum of x missing chat messages of the chat, where x is identified by the pagination parameter. In one embodiment, the method further includes sending a further chat message restore request from the edge device to the at least one other edge device of the at least one other participant in the chat for a next set of x missing chat messages of the chat. Advantageously, providing a pagination parameter which identifies a number of missing chat messages to be received based on the chat message restore request, allows for selective bulk-restoring of multiple missing chat messages on the edge device. In one or more implementations, pagination can be used to allow selective bulk-restoring of messages forward or backward from a particular chat message identified by at least one metadata attribute. In addition, selective bulk-restoring of messages can be repeated by sending a further chat message restore request from the edge device to the at least one other edge device for a next set of x missing chat messages of the chat. In one embodiment, pagination can be continued in a loop until all missing chat messages are restored on the edge device.

In one or more embodiments, the sending of the chat message restore request includes broadcasting the chat message restore request from the user's edge device to multiple other edge devices of multiple other participants in the chat, where the at least one other device is at least one other device of the multiple other edge devices. Advantageously, in one embodiment, the chat can be a group chat, and sending the chat message restore request includes broadcasting the chat message restore request from the user's edge device to multiple other edge devices of multiple other participants in the chat. In one or more embodiments, the chat message restore request is sent to a selected group of participants of the group chat, or to all participants of the group chat.

In one or more embodiments, the chat message restore request identifies multiple missing chat messages of the chat to be restored on the edge device, and the receiving includes receiving at the edge device from the multiple other edge devices multiple copies of one or more chat messages of the chat that were missing, where chat messages of the chat received at the edge device from the multiple other edge devices are sorted by timestamp. Advantageously, multiple missing chat messages of the chat can be identified for restoring in the chat message restore request, and the computer-implemented method can receive at the edge device from the multiple other edge devices multiple copies of one or more chat messages of the chat that were missing, with the chat messages of the chat received at the edge device from multiple other edge devices being sorted by timestamp to, for instance, facilitate identifying at the edge device the multiple copies of the one or more chat messages of the chat that were missing.

In one embodiment, the computer-implemented method further includes de-duplicating, at the edge device, duplicate chat messages of the chat received from the multiple other edge devices to obtain de-duplicated chat messages of the chat, and presenting by the edge device the de-duplicated chat messages of the chat to the user. Advantageously, the computer-implemented method de-duplicates, at the edge device, duplicate chat message of the chat received from the multiple other edge devices to obtain de-duplicated chat messages of the chat for presentation to the user. By de-duplicating chat messages, the amount of chat message data to be stored at the edge device is reduced, thereby facilitating processing within the edge device.

In one embodiment, the presenting includes displaying by the edge device the de-duplicated chat messages reinserted in correct time sequence within the chat. In another embodiment, the presenting includes displaying by the edge device the de-duplicated chat messages in correct time sequence separate from the chat. Advantageously, presenting the de-duplicated chat messages of the chat to the user can include either reinserting in correct time sequence the de-duplicated chat messages within the chat for display to the user, or displaying by the edge device the de-duplicated chat messages in correct time sequence separate from the chat, for instance, as an overlay, if desired.

In one or more embodiments, the locate chat message request includes a chat message search request, and the at least one search parameter includes at least one search term for searching content of chat messages in the chat. In one embodiment, the at least one missing chat message received at the edge device contains a content-relevant result based on the at least one search term. Advantageously, selective searching for at least one missing chat message for an edge device is provided, where the locate chat message request is a chat message search request, and the at least one search parameter includes at least one search term for searching content of chat messages in the chat. In this manner, a user can initiate a distributed search for the at least one search term on other edge device(s) and receive at the user's edge device content-relevant results based on the at least one search term.

In one or more embodiments, sending the chat message search request includes sending the chat message search request from the user's edge device to multiple other edge devices of multiple other participants in the chat. In one embodiment, multiple copies of one or more chat messages of the chat are received at the edge device from the multiple other edge devices and are sorted by timestamp. In one or more embodiments, the computer-implemented method further includes de-duplicating, at the edge device, duplicate chat messages of the chat received from the multiple other edge devices to obtain de-duplicated chat messages of the chat, and presenting by the edge device the de-duplicated chat messages of the chat to the user. Advantageously, the chat message search request can be sent to a selected group of participants to search for the at least one search term in locally-saved chat messages of the chat. Further, the computer-implemented method includes de-duplicating, at the edge device, duplicate chat messages of the chat received from the multiple other edge devices to obtain de-duplicated chat messages of the chat for presentation by the edge device to the user, thereby facilitating processing within the edge device.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4B depicts one example only of a message format sent via a messaging application with end-to-end encryption, which is to incorporate and use locate chat message processing, in accordance with one or more aspects of the present invention;

FIGS. 5A-5D depict one example of a chat message restore process, in accordance with one or more aspects of the present invention;

FIGS. 6A-6E depict another example of a chat message restore process, in accordance with one or more aspects of the present invention; and FIGS. 7A-7I depict a further example of a chat message search and restore process, in accordance with one or more aspects of the present invention.

DETAILED DESCRIPTION

Figure 1:
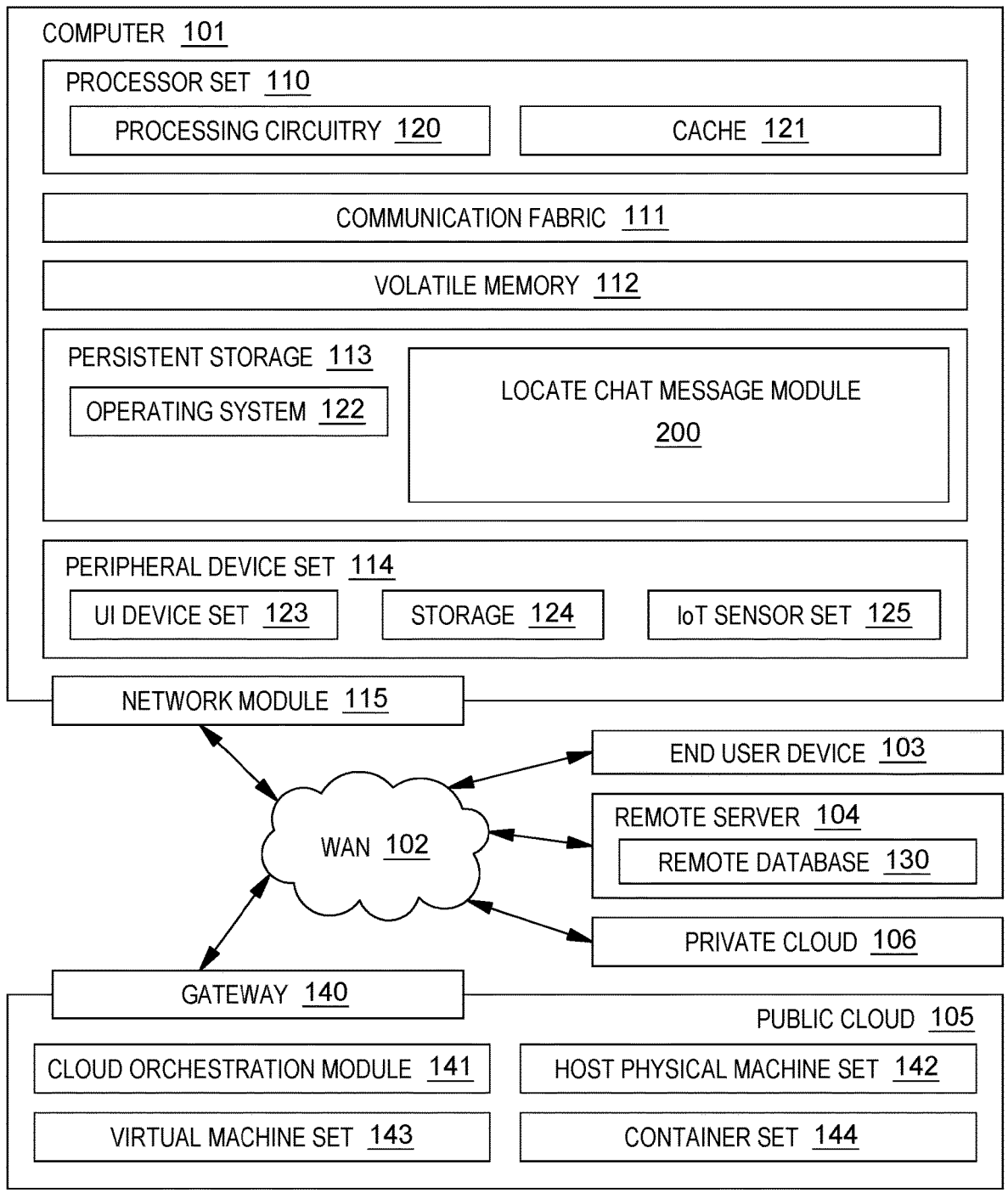
FIG. 1 depicts one example of a computing environment to include and use one or more aspects of the present invention.

In one or more aspects, disclosed herein are computer-implemented methods of facilitating processing within a computing environment. The computer-implemented method includes sending a locate chat message request from a user's edge device to at least one other edge device of at least one other participant in a chat with the user via an end-to-end encryption messaging system. The locate chat message request identifies at least one search parameter for the at least one missing chat message of the chat on the edge device. The computer-implemented method further includes, based on sending the locate chat message request, receiving at the edge device from the at least one other edge device, the at least one missing chat message of the chat identified via the at least one search parameter. Advantageously, improved processing within a computing environment is provided. In particular, a computer-implemented method is provided to facilitate locating for the edge device one or more missing chat messages of a chat, where the chat is via an end-to-end encryption messaging system.

In one or more embodiments, the locate chat message request includes a chat message restore request, with the at least one missing chat message identified via the at least one search parameter being at least one missing chat message of the chat to be restored on the edge device. In one embodiment, the at least one search parameter is at least one metadata attribute of the at least one missing chat message. In one or more embodiments, a metadata attribute of the at least one metadata attribute is selected from the group consisting of: a message identifier of the at least one missing chat message, and a message timestamp of the at least one missing chat message. Advantageously, an edge device facility is provided to selectively restore at the edge device at least one missing chat message of a chat via the end-to-end encryption messaging system. With the at least one search parameter, the at least one missing chat message is located on the at least one other edge device and returned to the user's edge device missing the chat message. With the at least one search parameter being at least one metadata attribute of the missing chat message, selective locating and restoring of the at least one missing chat message is provided.

In one or more embodiments, the chat message restore request further identifies a pagination parameter, where the pagination parameter identifies a maximum number of missing chat messages to be received based on the chat message restore request. In one embodiment, the receiving includes receiving at the edge device from the at least one other edge device a maximum of x missing chat messages of the chat, where x is identified by the pagination parameter. In one embodiment, the method further includes sending a further chat message restore request from the edge device to the at least one other edge device of the at least one other participant in the chat for a next set of x missing chat messages of the chat. Advantageously, providing a pagination parameter which identifies a number of missing chat messages to be received based on the chat message restore request, allows for selective bulk-restoring of multiple missing chat messages on the edge device. In one or more implementations, pagination is used to allow selective bulk-restoring of messages forward or backward from a particular chat message identified by at least one metadata attribute. In addition, selective bulk-restoring of messages can be repeated by sending a further chat message restore request from the edge device to the at least one other edge device for a next set of x missing chat messages of the chat. In one embodiment, pagination can be continued in a loop until all required missing chat messages are restored on the edge device.

In one or more embodiments, the sending of the chat message restore request includes broadcasting the chat message restore request from the user's edge device to multiple other edge devices of multiple other participants in the chat, where the at least one other device is at least one other device of the multiple other edge devices. Advantageously, in one embodiment, the chat is a group chat, and sending the chat message restore request includes broadcasting the chat message restore request from the user's edge device to multiple other edge devices of multiple other participants in the chat. In one or more embodiments, the chat message restore request is sent to a selected group of participants of the group chat, or to all participants of the group chat.

In one or more embodiments, the chat message restore request identifies multiple missing chat messages of the chat to be restored on the edge device, and the receiving includes receiving at the edge device from the multiple other edge devices multiple copies of one or more chat messages of the chat that were missing, where chat messages of the chat received at the edge device from the multiple other edge devices are sorted by timestamp. Advantageously, multiple missing chat messages of the chat can be identified for restoring in the chat message restore request, and the computer-implemented method can receive at the edge device from the multiple other edge devices multiple copies of one or more chat messages of the chat that were missing, with the chat messages of the chat received at the edge device from multiple other edge devices being sorted by timestamp to, for instance, facilitate identifying at the edge device the multiple copies of the one or more chat messages of the chat that were missing.

In one embodiment, the computer-implemented method further includes de-duplicating, at the edge device, duplicate chat messages of the chat received from the multiple other edge devices to obtain de-duplicated chat messages of the chat, and presenting by the edge device the de-duplicated chat messages of the chat to the user. Advantageously, the computer-implemented method de-duplicates, at the edge device, duplicate chat message of the chat received from the multiple other edge devices to obtain de-duplicated chat messages of the chat for presentation to the user. By de-duplicating chat messages, the amount of chat message data to be stored at the edge device is reduced, thereby facilitating processing within the edge device.

In one embodiment, the presenting includes displaying by the edge device the de-duplicated chat messages reinserted in correct time sequence within the chat. In another embodiment, the presenting includes displaying by the edge device the de-duplicated chat messages in correct time sequence separate from the chat. Advantageously, presenting the de-duplicated chat messages of the chat to the user can include either reinserting in correct time sequence the de-duplicated chat messages within the chat for display to the user, or displaying by the edge device the de-duplicated chat messages in correct time sequence separate from the chat, for instance, as an overlay, if desired.

In one or more embodiments, the locate chat message request includes a chat message search request, and the at least one search parameter includes at least one search term for searching content of chat messages in the chat. In one embodiment, the at least one missing chat message received at the edge device contains a content-relevant result based on the at least one search term. Advantageously, selective searching for at least one missing chat message for an edge device is provided, where the locate chat message request is a chat message search request, and the at least one search parameter includes at least one search term for searching content of chat messages in the chat. In this manner, a user can initiate a distributed search for the at least one search term on other edge device(s) and receive at the user's edge device content-relevant results based on the at least one search term.

In one or more embodiments, sending the chat message search request includes sending the chat message search request from the user's edge device to multiple other edge devices of multiple other participants in the chat. In one embodiment, multiple copies of one or more chat messages of the chat are received at the edge device from the multiple other edge devices and are sorted by timestamp. In one or more embodiments, the computer-implemented method further includes de-duplicating, at the edge device, duplicate chat messages of the chat received from the multiple other edge devices to obtain de-duplicated chat messages of the chat, and presenting by the edge device the de-duplicated chat messages of the chat to the user. Advantageously, the chat message search request can be sent to a selected group of participants to search for the at least one search term in locally-saved chat messages of the chat. Further, the computer-implemented method includes de-duplicating, at the edge device, duplicate chat messages of the chat received from the multiple other edge devices to obtain de-duplicated chat messages of the chat for presentation by the edge device to the user, thereby facilitating processing within the edge device.

In another aspect, a computer system for facilitating processing within a computing environment is provided. The computer system includes a memory, and at least one processor in communication with the memory, where the computer system is configured to perform a method. The method includes sending a locate chat message request from a user's edge device to at least one other edge device of at least one other participant in a chat with the user using an end-to-end encryption messaging system. The locate chat message request identifies at least one search parameter for at least one missing chat message on the edge device. Based on sending the locate chat message request, the at least one edge device receives from the at least one other edge device the at least one missing chat message in the chat identified via the at least one search parameter. Advantageously, improved processing within a computing environment is provided. In particular, the method facilitates locating for the edge device one or more missing chat messages of a chat, where the chat is via an end-to-end encryption messaging system.

In one or more embodiments, the locate chat message request includes a chat message restore request, with the at least one missing chat message identified via the at least one search parameter being at least one missing chat message of the chat to be restored on the edge device, and the at least one search parameter being at least one metadata attribute of the at least one missing chat message. In one embodiment, a metadata attribute of the at least one metadata attribute is selected from the group consisting of: a message identifier of the at least one missing chat message, and a message timestamp of the at least one missing chat message. Advantageously, an edge device facility is provided to selectively restore at the edge device at least one missing chat message of a chat via the end-to-end encryption messaging system. With the at least one search parameter, the at least one missing chat message is located on the at least one other edge device and returned to the user's edge device missing the chat message. With the at least one search parameter being at least one metadata attribute of the missing chat message, selective locating and restoring of the at least one missing chat message is provided.

In one embodiment, the chat message restore request further identifies a pagination parameter, where the pagination parameter identifies a maximum number of missing chat messages to be restored based on the chat message restore request. In one embodiment, the receiving includes receiving at the edge device from the at least one other edge device a set of x missing chat messages of the chat, where x is identified by the pagination parameter. Advantageously, providing a pagination parameter which identifies a number of missing chat messages to be received based on the chat message restore request, allows for selective bulk-restoring of multiple missing chat messages on the edge device. In one or more implementations, pagination is used to allow selective bulk-restoring of messages forward or backward from a particular chat message identified by at least one metadata attribute. In addition, selective bulk-restoring of messages can be repeated by sending a further chat message restore request from the edge device to the at least one other edge device for a next set of x missing chat messages of the chat. In one embodiment, pagination can be continued in a loop until all required missing chat messages are restored on the edge device.

In one or more embodiments, the sending includes broadcasting the chat message restore request from the user's edge device to multiple other edge devices of multiple other participants in the chat, where the at least one other edge device is at least one other edge device of the multiple other edge devices. Advantageously, in one embodiment, the chat is a group chat, and sending the chat message restore request includes broadcasting the chat message restore request from the user's edge device to multiple other edge devices of multiple other participants in the chat. In one or more embodiments, the chat message restore request is sent to a selected group of participants of the group chat, or to all participants of the group chat.

In one embodiment, the chat message restore request identifies multiple missing chat messages of the chat to be restored on the edge device, and the receiving includes receiving at the edge device from the multiple other edge devices multiple copies of one or more chat messages of the chat that were missing at the edge device. In one embodiment, the chat messages of the chat received at the edge device from the multiple other edge devices are sorted by timestamp, and the method further includes de-duplicating, at the edge device, duplicate chat messages of the chat received from the multiple other edge devices to obtain de-duplicated chat messages of the chat, and presenting by the edge device the de-duplicated chat messages of the chat to the user. In one embodiment, the presenting includes displaying by the edge device the de-duplicated chat messages reinserted in correct time sequence within the chat. Advantageously, multiple missing chat messages of the chat can be identified for restoring in the chat message restore request, and the computer-implemented method can receive at the edge device from the multiple other edge devices multiple copies of one or more chat messages of the chat that were missing, with the chat messages of the chat received at the edge device from multiple other edge devices being sorted by timestamp to, for instance, facilitate identifying at the edge device the multiple copies of the one or more chat messages of the chat that were missing. Advantageously, the computer-implemented method de-duplicates, at the edge device, duplicate chat message of the chat received from the multiple other edge devices to obtain de-duplicated chat messages of the chat for presentation to the user. By de-duplicating chat messages, the amount of chat message data to be stored at the edge device is reduced, thereby facilitating processing within the edge device.

In one embodiment, the locate chat message request includes a chat message search request, and the at least one search parameter includes at least one search term for searching content of chat messages in the chat, where the at least one missing chat message received at the edge device contains a content-relevant result based on the at least one search term. Advantageously, selective searching for at least one missing chat message for an edge device is provided, where the locate chat message request is a chat message search request, and the at least one search parameter includes at least one search term for searching content of chat messages in the chat. In this manner, a user can initiate a distributed search for the at least one search term on other edge device(s) and receive at the user's edge device content-relevant results based on the at least one search term.

In one or more embodiments, sending the chat message search request includes sending the chat message search request from the user's edge device to multiple other edge devices of multiple other participants in the chat. In one embodiment, multiple copies of one or more chat messages of the chat are received at the edge device from the multiple other edge devices and are sorted by timestamp. In one implementation, the method includes de-duplicating, at the edge device, duplicate chat messages of the chat received from the multiple other edge devices to obtain de-duplicated chat messages of the chat, and presenting by the edge device the de-duplicated chat messages of the chat to the user. Advantageously, the chat message search request can be sent to a selected group of participants to search for the at least one search term in locally-saved chat messages of the chat. Further, the computer-implemented method includes de-duplicating, at the edge device, duplicate chat messages of the chat received from the multiple other edge devices to obtain de-duplicated chat messages of the chat for presentation by the edge device to the user, thereby facilitating processing within the edge device.

In a further aspect, a computer program product for facilitating processing within a computing environment is provided. The computer program product includes one or more computer-readable storage media and program instructions embodied therewith. The program instructions are readable by a processing circuit to cause the processing circuit to perform a method, which includes sending a locate chat message request from a user's edge device to at least one other edge device of at least one other participant in a chat with a user via an end-to-end encryption messaging system. The locate chat message request identifies at least one search parameter for at least one missing chat message of the chat on the edge device. Based on sending the locate chat message request, the method includes receiving at the edge device from the at least one other edge device, the at least one missing chat message of the chat identified via the at least one search parameter. Advantageously, improved processing within a computing environment is provided. In particular, a method is provided to facilitate locating for an edge device one or more missing chat messages, where the chat is via an end-to-end encryption messaging system.

In one or more embodiments, the locate chat message request includes a chat message restore request, with the at least one missing chat message identified via the at least one search parameter being at least one missing chat message of the chat to be restored on the edge device, and the at least one search parameter being at least one metadata attribute of the at least one missing chat message. In one embodiment, a metadata attribute of the at least one metadata attribute is selected from the group consisting of: a message identifier of the at least one missing chat message, and a message timestamp of the at least one missing chat message. Advantageously, an edge device facility is provided to selectively restore at the edge device at least one missing chat message of a chat via the end-to-end encryption messaging system. With the at least one search parameter, the at least one missing chat message can be located on the at least one other edge device and returned to the user's edge device missing the chat message. With the at least one search parameter being at least one metadata attribute of the missing chat message, selective locating and restoring of the at least one missing chat message is provided.

As noted, messaging systems provide channels or pipelines of communication between messaging applications executing on different user edge devices, including the sending and receiving of chat messages. The edge devices can be, or include, a variety of edge devices capable of sending and receiving chat message data, such as smartphones, computers, laptops, tablets, etc.

A variety of messaging systems or services exist, including instant messaging, such as via the Internet. Instant messaging technology is a type of online chat that allows real-time message transmission over the Internet, or another computer network. Certain messaging systems, such as certain instant messaging systems, are end-to-end encryption messaging systems that store messages via local-based, edge device storage only, that is, without any server storage, such as cloud-based server storage of messages. An end-to-end encryption messaging system maintains security of chat messages when in transit between ends, that is, between edge devices. In implementation, the messaging application executing on the edge devices includes an encryption/decryption module or process to encrypt chat messages before sending to one or more other edge devices via the messaging system, and decrypt encrypted messages received from the one or more other edge devices. In this manner, chat messages are maintained confidential while in transit. A variety of messaging applications use end-to-end encryption to ensure private communication between users. The advantage of end-to-end encryption is that unauthorized persons cannot access the message.

An issue arises when a user has lost the ability to access one or more chat messages of a chat on the user's edge device, such as might occur in connection with a chat using an end-to-end encryption messaging system where message data is only stored locally. As used herein, one or more missing chat messages (i.e., lost data) includes message data that the user previously received, but does not currently have a way to restore, search, copy, or move, at a local device, nor from a backup, such as at the user's local edge device or a server of the messaging system, or a cloud-based storage. Chat messages can be missing (i.e., lost) from a user's edge device for a variety of reasons, for instance, the user's edge device is broken, impaired, or was misplaced or otherwise lost, and no backup of the messaging system was done. Even where the user periodically performs a backup, such as on a weekly basis, the user's edge device could have been broken or lost in-between backups, and therefore, chat message data that was created between backups is lost to the user's edge device. In another example, a user could have deleted one or more chat messages from a chat, either intentionally or mistakenly. In such a case, the message data is lost and not included in a future backup of the message system data, nor if the user changes phones and moves existing message data to the new phone.

With end-to-end encryption messaging systems, only participants in a chat have access to the chat messages, with the messaging system server providing the channels or pipelines of communication between the messaging applications executing on the different user edge devices. Disclosed herein, in one or more aspects, is a locate chat message facility or module which provides selective searching and restoring of missing chat messages (i.e., lost data) in an end-to-end encryption messaging system, while still respecting privacy of the messages. The computer-implemented methods, computer systems and computer program products disclosed herein are for cases where the missing chat messages are only stored on edge devices of participants of a chat, such as a group chat, using an end-to-end encryption messaging system.

One or more aspects of the present invention are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, including any type of edge device, etc., that is capable of executing a process (or multiple processes) that, e.g., perform locate chat message processing (e.g., chat message search and/or restore processing), such as disclosed herein. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as locate chat message module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. Further, in one or more embodiments, one or more of the components/modules of FIG. 1 need not be included in the computing environment and/or are not used for one or more aspects of the present invention. Further, in one or more embodiments, additional and/or other components/modules can be used. Other variations are possible.

Figure 2A:
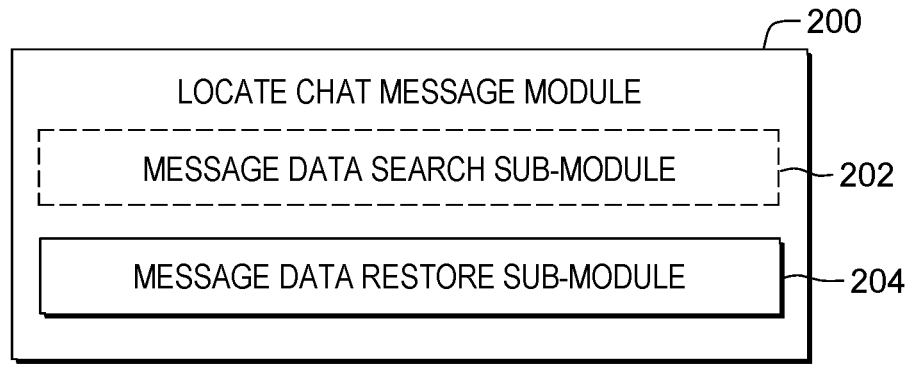
FIGS. 2A-2C depict one example of the locate chat message module of FIG. 1, including a message data search sub-module and a message data restore sub-module, in accordance with one or more aspects of the present invention.
Figure 2B:
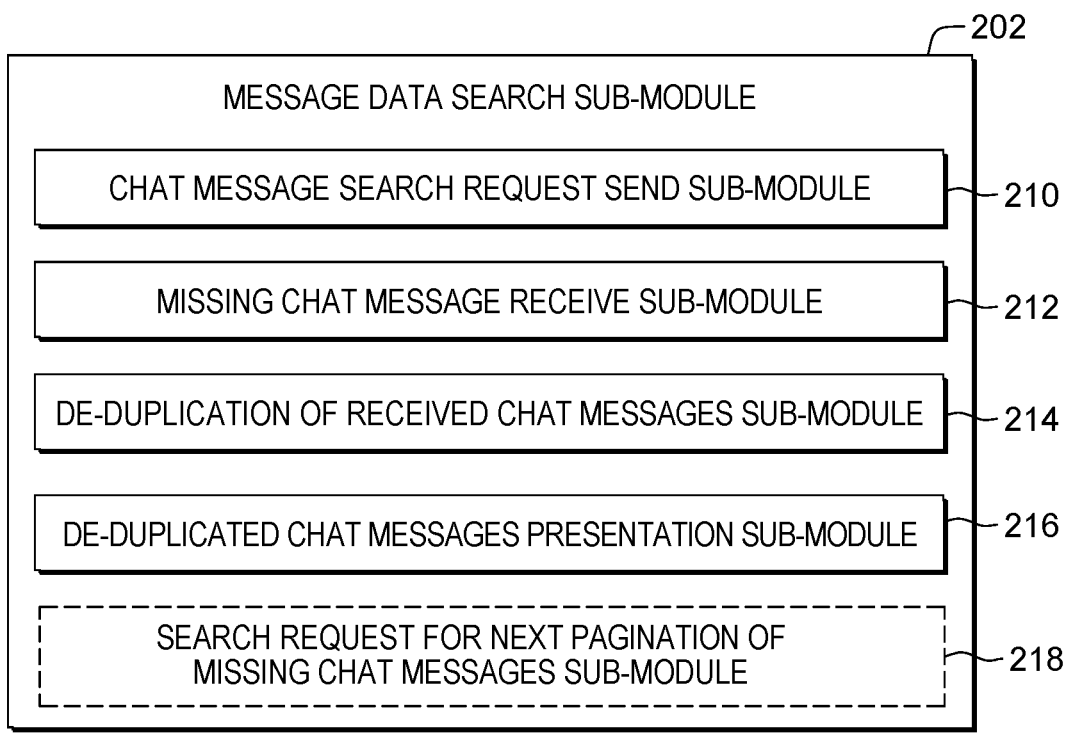
Figure 2C:
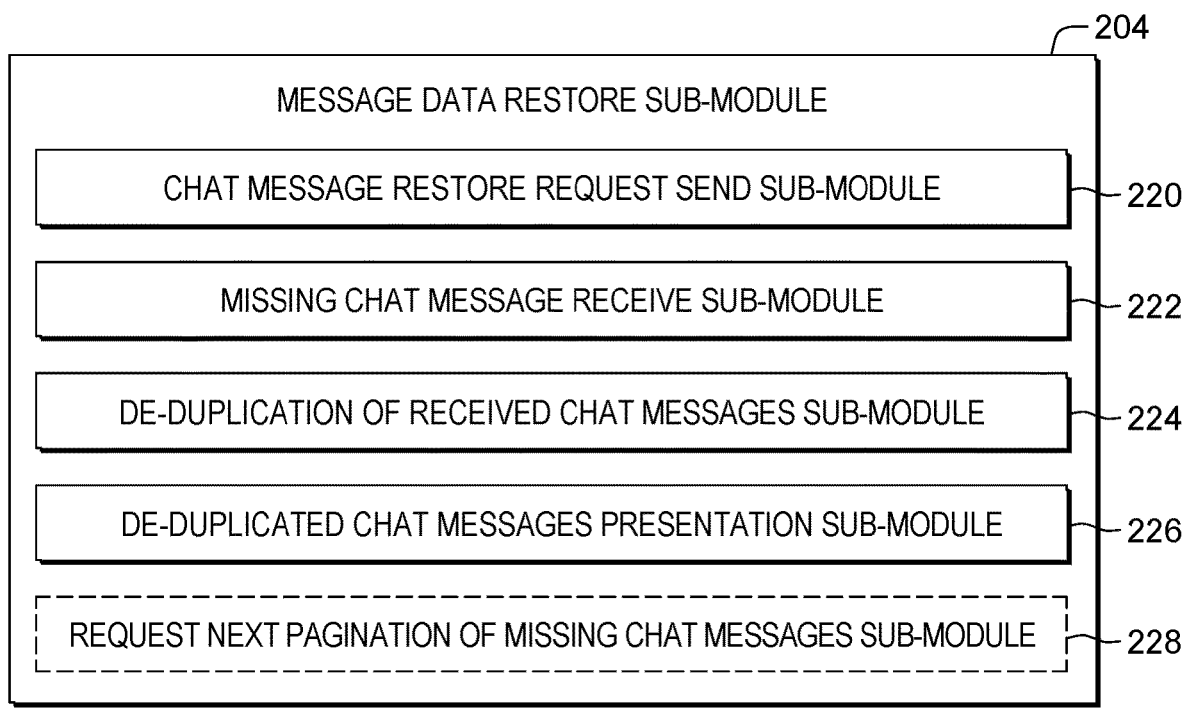
Figure 3A:
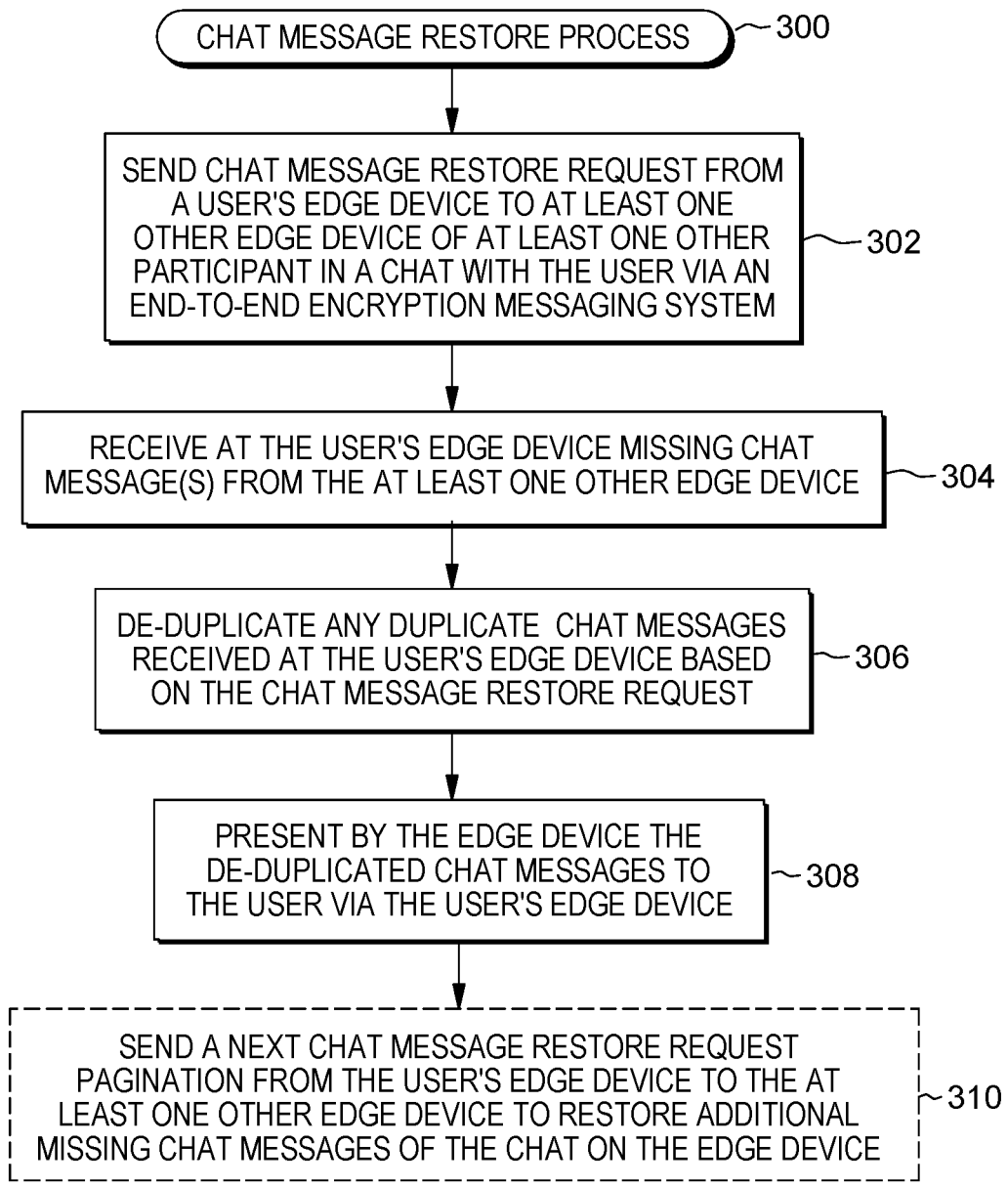
FIG. 3A depicts one example of a chat message restore process, in accordance with one or more aspects of the present invention.
Figure 3B:
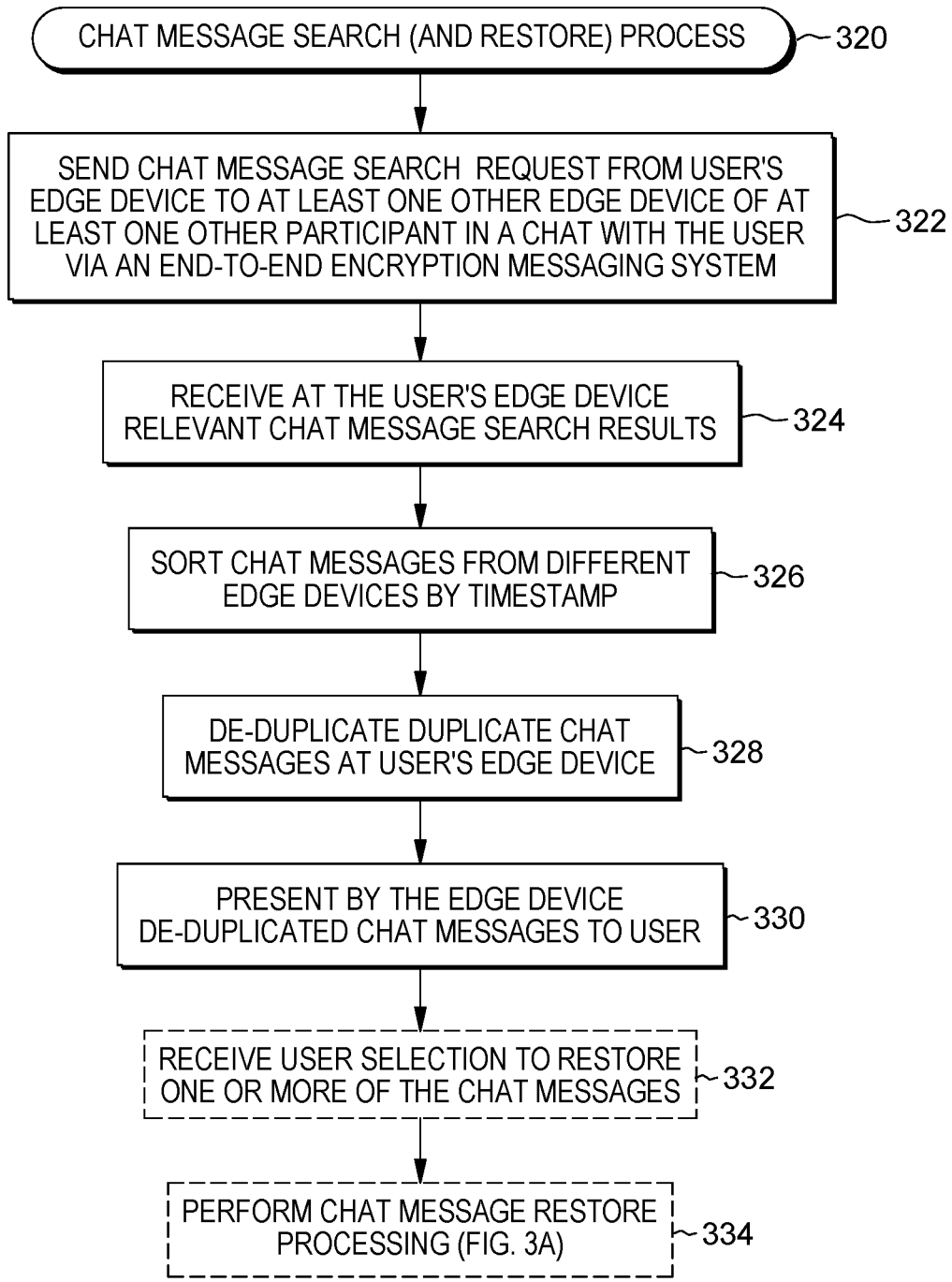
FIG. 3B depicts one example of a chat message search (and optional restore) process, in accordance with one or more aspects of the present invention.

By way of example, one or more embodiments of a locate chat message module and process are described initially with reference to FIGS. 2A-3B. FIGS. 2A-2C depict one embodiment of locate chat message module 200 that includes code or instructions to perform chat message search and/or restore processing, in accordance with one or more aspects of the present invention, and FIGS. 3A-3B depict embodiments of a chat message restore process and a chat message search (and restore) process, respectively, in accordance with one or more aspects of the present invention.

Referring to FIGS. 1 & 2, locate chat message module 200 includes, in one example, various sub-modules used to perform processing, in accordance with one or more aspects of the present invention. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

In the FIG. 2A embodiment, example sub-modules of locate chat message module 200 include, for instance, an optional message data search sub-module 202, one embodiment of which is depicted in FIG. 2B, and a message data restore sub-module 204, one embodiment of which is depicted in FIG. 2C.

In the embodiment of FIG. 2B, message data search sub-module 202 includes a chat message search request send sub-module 210 to send a chat message search request from the user's edge device to at least one other edge device of at least one other participant in the chat, where the chat message search request identifies one or more search terms for locally searching content of chat messages in the chat. Further, message data search sub-module 202 includes, in one embodiment, missing chat message receive sub-module 212 to receive at the user's edge device, based on sending the chat message search request, at least one missing chat message from the at least one other edge device with content-relevant results based on the at least one search term. Further, message data search sub-module 202 includes a de-duplication of received chat messages sub-module 214, which removes or consolidates received duplicate chat messages of the chat. For instance, in one embodiment, sending the chat message search request includes sending the chat message search request from the user's edge device to multiple other edge devices of multiple other participants in the chat, where chat messages of the chat received at the user's edge device from the multiple other edge devices are sorted by timestamp, and can include multiple chat message copies or duplications of a given chat message, with the duplications to be removed by de-duplication of relevant chat messages sub-module 214. Note that, in one or more embodiments, de-duplication refers to message data de-duplication, which is a process for eliminating extra or duplicate copies of data, such as message data. By merging or removing duplicate copies, improved storage utilization is obtained, for instance, at the user's edge device. In one embodiment, the de-duplication process compares chat messages arranged by timestamp to identify duplicate copies of a particular chat message. When a duplicate copy is identified, only one copy of the chat message is retained, with one or more other copies being deleted.

In one or more embodiments, message data search sub-module 202 also includes a de-duplicated chat message presentation sub-module 216 to present by the edge device the de-duplicated and timestamp-sorted chat messages of the chat to the user. In one embodiment, presenting the de-duplicated chat messages includes displaying the de-duplicated chat messages of the chat. For instance, the displaying of the de-duplicated chat messages can include displaying by the edge device the de-duplicated chat messages in correct time sequence separate from the chat, in one embodiment only. For instance, the messages can be displayed as an overlay on a display interface of the edge device that allows the user to view and/or select one or more messages of the displayed chat messages. For instance, in one or more embodiments, the user selects a chat message of the de-duplicated chat messages being displayed for restoration on the user's edge device in the chat, along with (in one embodiment) a maximum number x of preceding or subsequent chat messages as defined by a pagination parameter associated with a chat message restore request, such as described below with reference to FIG. 2C. Optionally, in one or more embodiments, a further search request for a next pagination of missing chat messages sub-module 218 is included to facilitate sending, using the messaging application, a next pagination chat message search request from the user's edge device to the at least one other edge device of the at least one other participant in the chat for, for instance, a next set of x chat messages with content-relevant results based on the at least one search term.

FIG. 2C depicts one embodiment of message data restore sub-module 204 which includes, for instance, a chat message data restore request send sub-module 220, which sends, using a messaging application, a chat message restore request from the user's edge device to at least one other edge device of at least one other participant in a chat with the user via the end-to-end encryption messaging system. The chat message restore request identifies at least one metadata attribute of at least one missing chat message of the chat to be restored on the user's edge device. Note that, in one embodiment, the chat message restore request sent to the at least one other edge device of at least one other participant in the chat using the end-to-end encryption messaging system is received at the at least one other edge device, and a local messaging application search facility at the at least one other edge device identifies, based on the at least one search parameter, the at least one missing chat message of the chat on the at least one other edge device for return to the user's edge device.

Message data restore sub-module 204 further includes a missing chat message receive sub-module 222, which receives at the edge device, based on the chat message restore request, the at least one missing chat message of the chat identified by the at least one metadata attribute, and to be restored on the user's edge device. In addition, message data restore sub-module 204 includes, in one embodiment, a de-duplication of received chat messages sub-module 224 to facilitate de-duplicating, at the edge device, duplicate copies of chat messages received from multiple other edge devices and sorted by timestamp to obtain de-duplicated chat messages of the chat. In addition, the message data restore sub-module includes a de-duplicated chat messages presentation sub-module 226, which allows the edge device to present to the user the de-duplicated, timestamp-sorted chat messages. Optionally, a request next pagination of missing chat messages sub-module 228 is included to facilitate sending, using the messaging application, a next pagination chat message restore request from the user's edge device to the at least one other edge device of the at least one other participant in the chat for a next set of x chat messages, where a pagination attribute identifies a maximum number x of chat messages to be received based on the chat message restore request. In one embodiment, the pagination attribute, identifying the maximum number (x) of messages to be received based on the chat message restore request, can be preset or user-configurable. For instance, in one embodiment, the pagination attribute can identify a set of forward or backward in-time chat messages to be located on the at least one other edge device and returned to the user's edge device. By way of example only, x can be 10, 100, 1000, etc., as desired for a particular request and/or application.

Advantageously, processing within a computing environment is facilitated by one or more aspects of the locate chat message module facility disclosed herein. For instance, the locate chat message module allows for recovery of missing chat messages of a type that are not currently recoverable in an end-to-end encryption messaging system. Additionally, the recovery of chat messages is a selective recovery of at least one requested chat message. Advantageously, a selective search and restore of missing chat messages facility is provided, which allows for missing or lost chat messages in a messaging system to be returned to a user's edge device, while still protecting privacy of the message data itself. Privacy is maintained using the locate chat messages facility since the sending and receiving of data uses the end-to-end encryption messaging system itself. That is, in one or more embodiments, the locate chat messages module or facility is integrated within the end-to-end encryption system. Further, in one or more embodiments, any duplicate chat messages received from two or more other edge devices of two or more other participants in the chat are removed by de-duplication.

Note that although various sub-modules are described, locate chat message module processing, including message data search sub-module processing (FIG. 2B) and message data restore sub-module processing (FIG. 2C), can use, or include, additional, fewer, and/or different sub-modules. A particular sub-module can include additional code, including code of other sub-modules, or less code. Further, additional and/or other modules can be used. Many variations are possible.

In one or more embodiments, the sub-modules are used, in accordance with one or more aspects of the present invention, to perform locate chat message processing. FIGS. 3A & 3B depict examples of two locate chat message processes, such as disclosed herein. The processes are executed, in one or more examples, by a computer (e.g., computer 101 (FIG. 1)), and/or a processor or processing circuitry (e.g., of processor set 110 of FIG. 1), such as by one or more edge devices of a computing environment. In one example, code or instructions implementing the process, are part of a module, such as locate chat message module 200. In other examples, the code can be included in one or more other modules and/or in one or more sub-modules of the one or more other modules. Various options are available.

As one example, FIG. 3A depicts that a chat message restore process 300 executing on a computer (e.g., computer 101 of FIG. 1), a processor (e.g., a processor of processor set 110 of FIG. 1), and/or processing circuitry (e.g., processing circuitry of processor set 110), sends a chat message restore request from a user's edge device to at least one other edge device of at least one other participant in a chat with the user via messaging system 302, such as an end-to-end encryption messaging system; and receives at the user's edge device, at least one missing chat message from the at least one other edge device 304. Chat message restore process 300 further includes, in one embodiment, de-duplicating any duplicate chat messages received at the user's edge device based on the message restore request 306. For instance, in one embodiment, the sending can include broadcasting, using the messaging application, the chat message restore request from the user's edge device to multiple other edge devices of multiple other users participating in the chat with the user, in which case the receiving includes receiving at the edge device from the multiple other edge devices multiple copies of one or more missing chat messages of the chat, where chat messages received at the user's edge device from the multiple other edge devices can be already sorted by timestamp, or can be sorted by timestamp at the user's edge device. Where there are multiple copies of one or more chat messages of the chat, the duplicated copies of any chat message are de-duplicated or removed by, for instance, deleting one or more extra copies.

Further, in one embodiment, the chat message restore process includes presenting by the edge device the de-duplicated chat messages to the user 308. For instance, in one embodiment, the presenting can include displaying by the edge device the de-duplicated chat messages reinserted in correct time sequence within the chat of the messaging system. In another embodiment, the presenting can include displaying by the edge device the de-duplicated chat messages in correct time sequence separate from the chat of the messaging system, such as by an overlay window on a display interface of the edge device. Further, in one embodiment, chat message restore process 300 can optionally include sending a next chat message restore request pagination from the user's edge device to the at least one other edge device 310 where, for instance, the chat message restore request further identifies a pagination attribute, with the pagination attribute identifying a number of prior or subsequent messages to be located and returned to the edge device based on the message restore request, and where receiving the messages includes receiving at the user's edge device from the at least one other edge device a set of x messages, where x is a maximum number of messages identified by the pagination attribute.

In another example, FIG. 3B depicts one embodiment of a chat message search (and restore) process 320 executing on a computer (e.g., computer 101 of FIG. 1), a processor (e.g., a processor of processor set 110 of FIG. 1), and/or processing circuitry (e.g., processing circuitry of processor set 110), which sends a chat message search request from the user's edge device to at least one other edge device of at least one other participant in a chat with the user via a messaging system, such as an end-to-end encryption messaging system 322. The user's edge device receives in response relevant chat message search results 324. For instance, in one embodiment, the at least one search parameter of the chat message search request can include at least one search term for searching content of chat messages in the chat, and the at least one missing chat message received at the edge device can contain a content-relevant result based on the at least one search term.

In one embodiment, chat messages received from the at least one other edge device are sorted by timestamp 326. Chat message search (and restore) process 320 further includes, in one embodiment, de-duplicating any duplicate chat messages received at the user's edge device based on the message search request 328. As explained, where multiple copies of one or more chat messages of the chat are received, the duplicated copies of any chat message can be de-duplicated or removed, by, for instance, deleting one or more extra copies.

Further, in one embodiment, chat message search (and restore) process 320 includes presenting by the edge device the de-duplicated chat messages to the user 330. For instance, in one embodiment, the presenting can include displaying by the edge device the de-duplicated chat message in correct time sequence separate from the chat of the messaging system, such as by an overlay window on a display interface of the edge device. In one or more other embodiments, the de-duplicated chat messages can be reinserted in correct time sequence within the chat of the messaging system, if desired. Optionally, the user can select one or more received chat messages for restoring of the one or more chat messages 332 into the chat on the user's edge device. In this case, the chat message search (and restore) process 320 performs chat message restore processing 334, such as described above in connection with the example of FIG. 3A.

Figure 4A:
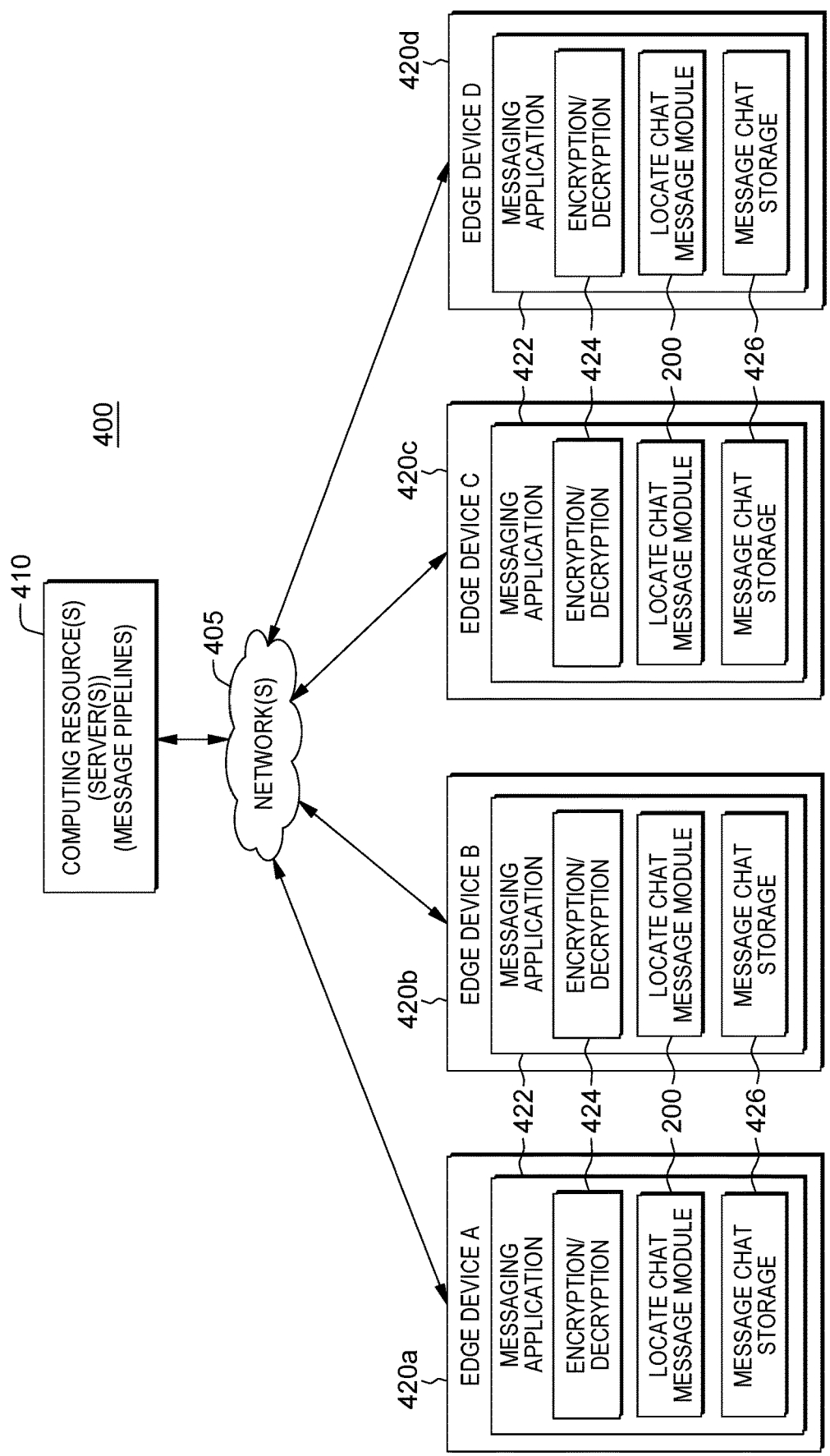
FIG. 4A depicts another embodiment of a computing environment to include and use one or more aspects of the present invention.

FIG. 4A depicts another embodiment of a technical environment or system 400, into which various aspects of some embodiments of the present invention are implemented. In one embodiment, system 400 can be, or include, one or more systems 100 described above in connection with FIG. 1. By way of example, system 400 includes one or more computing resources 410, such as one or more servers of a messaging system or application that facilitate establishing messaging pipelines or channels between messaging applications 422 executing on multiple edge devices 420a, 420b, 420c & 420d. In one or more embodiments, edge devices 420a . . . 420d execute program code, such as messaging applications 422, which can include, or have associated therewith, encryption/decryption code 424, locate chat message module 200, such as described above in connection with FIGS. 1-2C, and message chat storage 426, in one embodiment only.

As noted, in the depicted embodiment, system 400 includes computing resource(s) 410 (e.g., processing servers) that execute program code, such as messaging system code to facilitate providing one or more message pipelines or communication channels of the messaging system between edge devices 420a . . . 420d to allow users of the edge devices to chat via the messaging system. As described herein, in one or more embodiments, the chat messages relayed between the edge devices via the message pipelines or channels are encrypted at the source edge device (e.g., edge device A), and decrypted at the recipient edge device (e.g., edge devices B, C & D), for instance, for presentation to a user(s) of the recipient edge device(s). Communication can be across one or more networks 405. By way of example, network(s) 405 can be, or include, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of transmitting and receiving data, including locate chat message requests and missing chat message responses, such as described herein. In one or more implementations, network(s) 405 can utilize any communications protocol that allows data to be transferred between components of system 400 (e.g., one or more wireless interconnection standards, Wi-Fi, cellular (e.g., 4G, 5G), Ethernet, etc.

By way of further example, FIG. 4B depicts one example of a chat message of a messaging system, such as an end-to-end encryption messaging system. In the example of FIG. 4B, the chat message contains the message itself, and selected metadata fields, such as a message ID field, a user ID field, and a coordinated universal time (UTC) timestamp field. The data can include actual bytes of encrypted message data, which are then decrypted at the receiving edge devices, as well as the type of message data, that is, whether, text, audio, image, video, etc., depending on the messaging system capabilities.

FIGS. 5A-5D depict one example of a chat message restore process, in accordance with one or more aspects of the present invention.

Figure 5A:
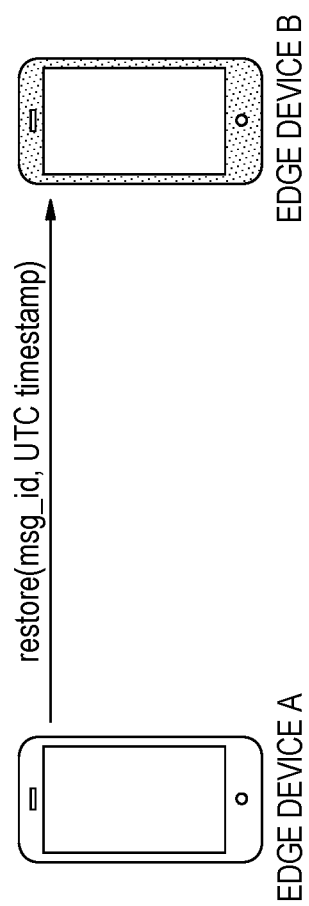

In the example of FIG. 5A, a user notes that edge device A is missing one or more chat messages of a confidential chat with a chat participant using edge device B, with in one example, edge device A being edge device A 420a, and edge device B being edge device B 420b of system 400 of FIG. 4A. Further, it is assumed that the chat is a confidential chat, using a messaging system with end-to-end encryption, and that the missing chat data is otherwise unavailable to edge device A, as in the case where edge device A is partially broken, was recently replaced, and/or there is no backup of the chat messages available on the messaging system server, edge device A, or another confidential storage location of a user of edge device A, such as a cloud-based storage.

As described herein, in one or more aspects, a locate chat message module or facility is associated with the messaging application executing on edge device A and edge device B, which allows for edge device A to send a locate chat message request to at least one other edge device of at least one other participant in a chat with the user via the messaging system, such as via an end-to-end encryption messaging system. In one embodiment, the locate chat message request identifies at least one search parameter for at least one missing chat message of the chat on the edge device. For instance, in the case of a chat message restore process, the locate chat message includes a chat message restore request, with the at least one missing chat message being at least one missing chat message of the chat to be restored on the edge device. In one or more embodiments, the chat message restore request includes at least one search parameter, such as at least one metadata attribute of the at least one missing chat message. For instance, the chat message restore request sent from edge device A to edge device B can include a chat message identifier (msg_id), and/or a UTC timestamp for the missing chat message.

One example of a chat message restore request is depicted in FIG. 5B. Those skilled in the art should note, however, that this is one specific example only of a chat message restore request, such as described herein. In the example of FIG. 5B, the request includes metadata for the restore request including, for instance, a message ID, a user ID and/or a UTC timestamp, as well as data which can include at least one search parameter, such as at least one metadata attribute of the missing chat message to be restored on the user's edge device. For instance, the message ID of the missing chat message and/or a timestamp associated with the missing chat message can be provided as part of the data payload in the restore request. In one or more embodiments, the chat message restore request further includes a pagination parameter with a page size specified, as well as whether forward or backward paging is indicated, that is, whether the receiving edge device should send the next x chat messages in the chat, or the x previous chat messages in the chat. In one or more embodiments, the restore request can be resent as a further pagination chat message restore request from the edge device to the at least one other edge device of the at least one other participant in the chat for a next set of x missing chat messages of the chat, which can occur any number of times as desired to retrieve an entire chat, or a portion of the entire chat.

Figure 5C:
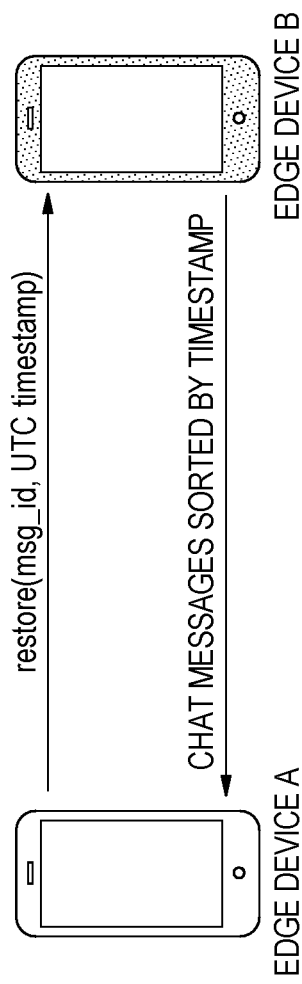
Figure 5D:
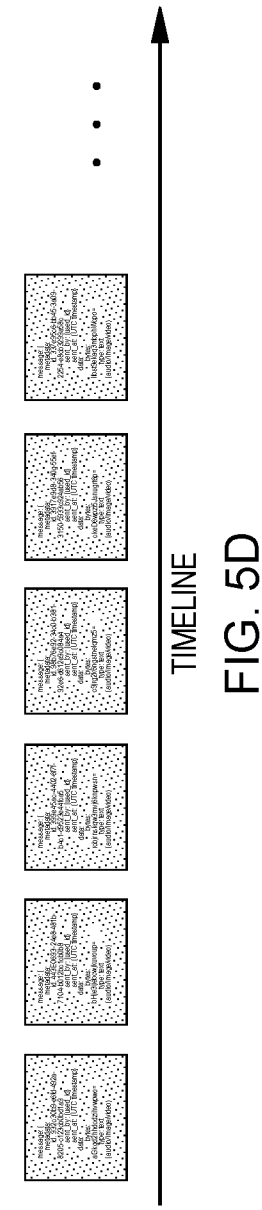

FIGS. 5C & 5D depict a sequence of chat messages sorted by timestamp being received at edge device A from edge device B pursuant to sending of the chat message restore request. As noted, in one or more embodiments, the messaging system includes local message search capabilities, such that the messaging application executing on edge device B can search locally stored chat messages of the identified chat to locate the at least one missing chat message to be returned to edge device A based on receipt of the chat message restore request from edge device A.

FIGS. 6A-6E depict further examples of chat message restore processing, in accordance with one or more aspects of the present invention.

Figure 6A:
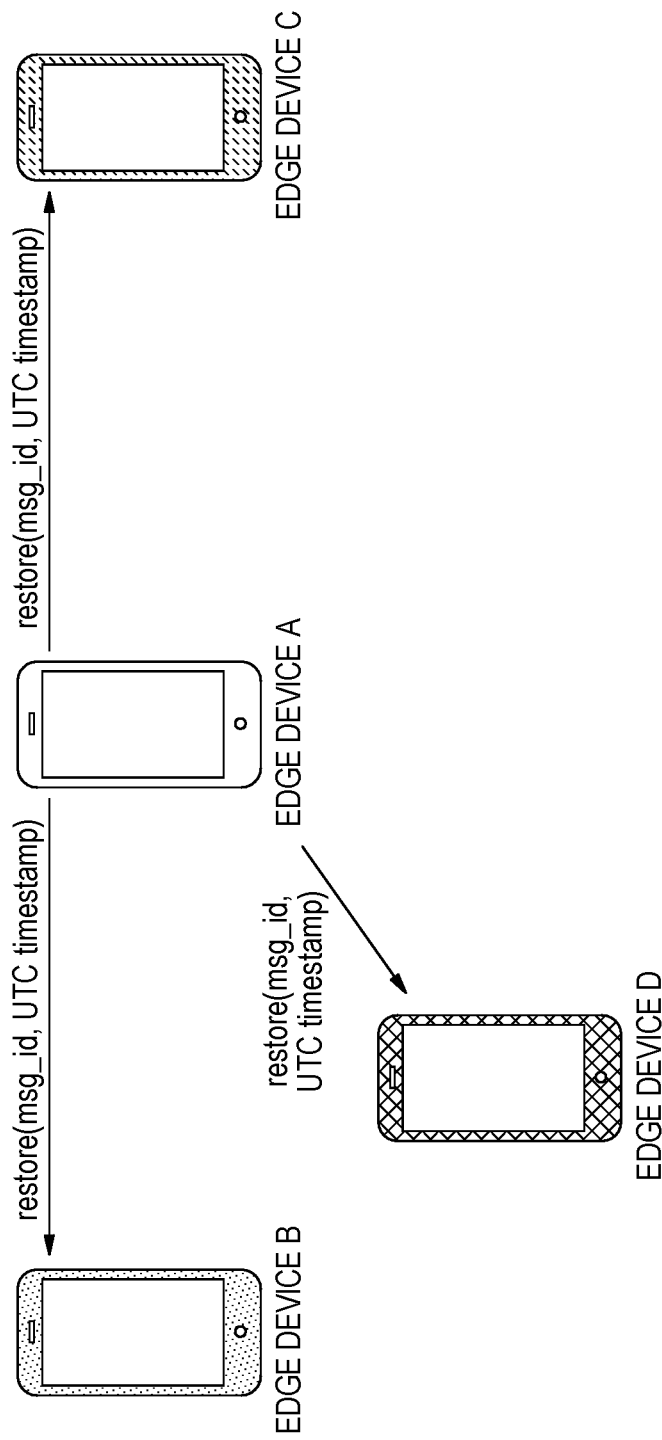

As illustrated in FIG. 6A, in this example, edge device A is sending a chat message restore request to multiple other edge devices (edge device B, edge device C, and edge device D) of multiple other participants in a chat with a user of edge device A using a messaging system with, for instance, end-to-end encryption, with chat messages being locally stored only on the edge devices of a system. In one embodiment, edge device A . . . edge device D are edge device A 420*a*-edge device D 420*d*, described above in connection with FIG. 4A. In this example, the user of edge device A has lost or is missing chat messages of a group chat with other chat participants using edge device B, edge device C & edge device D. The locate chat message module or facility disclosed herein allows for edge device A to recover missing chat messages by sending a chat message restore request to one or more selected participant edge devices of the group of participants in the chat. Note that the selected participant edge devices can be one, a portion of, or all, edge devices of the participants in the group chat. Thus, in the example of FIGS. 6A-6E, the users of edge device A-edge device D can be a portion of the users in the group chat, or all of the users in the group chat. Note in this regard that one or more users of the group chat may have a different sub-set of the chat messages available, since each user can delete locally, either intentionally or unintentionally, some or all of the messages in the group chat. In this regard, note that, in one or more embodiments, the chat message restore request sent from edge device A to edge device B . . . edge device D, includes a chat message identifier (msg_id) and a UTC timestamp for the missing chat message. Where, for instance, edge device B is also missing a particular chat message, edge device B could still respond with chat messages starting from the UTC timestamp of the restore request.

Figure 6B:
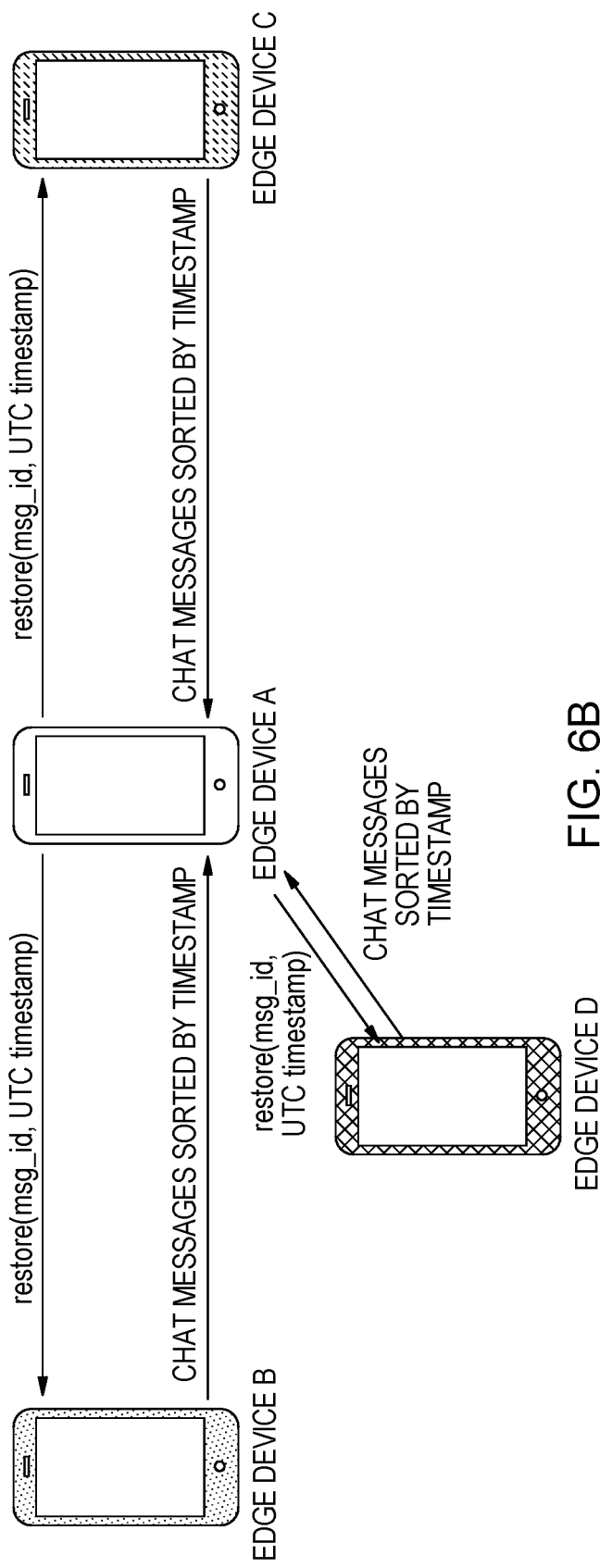

As illustrated in FIG. 6B, each participant edge device receiving the chat message restore request, that is, edge device B, edge device C & edge device D in the example, returns the requested chat messages sorted by timestamp to the requesting edge device, that is, edge device A (again in the example). As noted, the process integrates with the messaging system, including the messaging applications executing on edge device B, edge device C and edge device D, which allow for the searching of locally stored chat messages of the messaging system on that edge device. As illustrated in FIG. 6C, some of the recovered chat messages received at edge device A can be duplicate messages (that is, the same chat message is recovered from multiple different edge devices), and therefore, de-duplication of messages at the receiving edge device, edge device A in this example, is desirable. An example of this is depicted in FIG. 6C, where each of edge devices B. C & D have incomplete copies of the group chat, with each sending the chat messages available based on the chat message restore request search parameter and/or any pagination parameter associated with the request. In this manner, the locate chat message module or facility allows the user to selectively restore a desired portion of the group chat, such as from a specific message ID, or a specific message timestamp, etc. The returned chat messages to the requesting edge device are (in one embodiment) sorted by timestamp from the sending edge device. De-duplication of messages on the receiving edge device, that is, edge device A in the example of FIGS. 6A-6D, occurs, resulting in the desired segment of chat messages of the group chat being restored to edge device A, as illustrated in FIG. 6D.

Figure 6E:
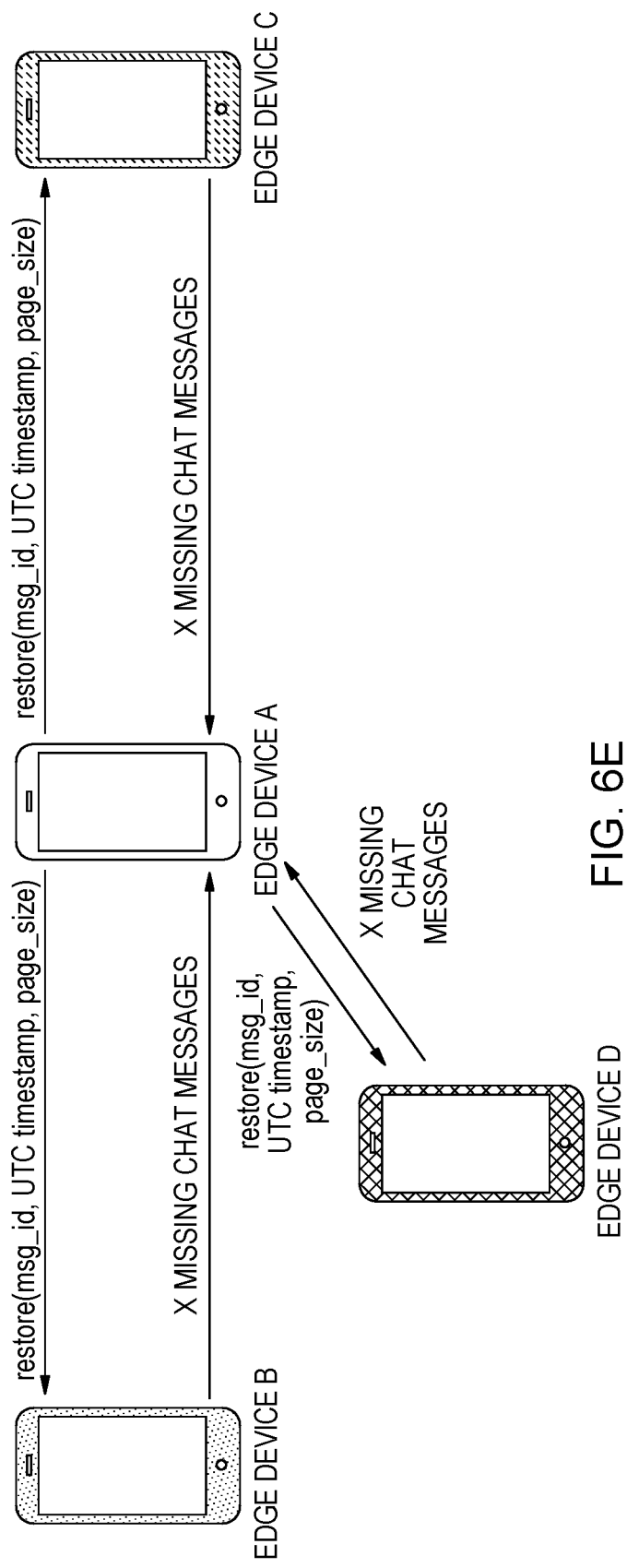

FIG. 6E illustrates a variation on the example of FIGS. 6A-6D, where a pagination parameter is also provided in association with the chat message restore request to allow for a specified maximum number of missing chat messages to be provided with each chat message restore request. For instance, page_size can be included in the data portion of the chat message restore request as a pagination parameter to specify a number of missing chat messages to be returned based on the chat message restore request. For example, a maximum of x missing chat messages of the chat can be requested in the restore request, where x is identified by the pagination parameter, as well as a forward or backward direction of the x chat messages to be returned within the chat. In one example, the page_size can be 10, 100, 1000, or any desired number of chat messages, and upon receipt, each edge device receiving the request sends the next x chat messages in the desired direction of the group chat. Note that pagination can be continued in a loop, if desired, until all required chat messages are restored at the user's edge device. Also note that, in one embodiment, where the user of edge device A lost a prior edge device and did not have message backup, then in that case, the metadata fields (msg_id or timestamp) are optional, and if they are not supplied by edge device A, then the receiving edge devices (edge device B . . . edge device D) can return results from the beginning of the message chat using pagination, which can be an approach to restoring the entire message chat when no backup was performed and the user's prior device was lost. Thus, the restore request (as well as the search request) discussed herein can be generated and sent without specifying the metadata fields for a particular missing chat message, depending on the context.

Figure 7A:
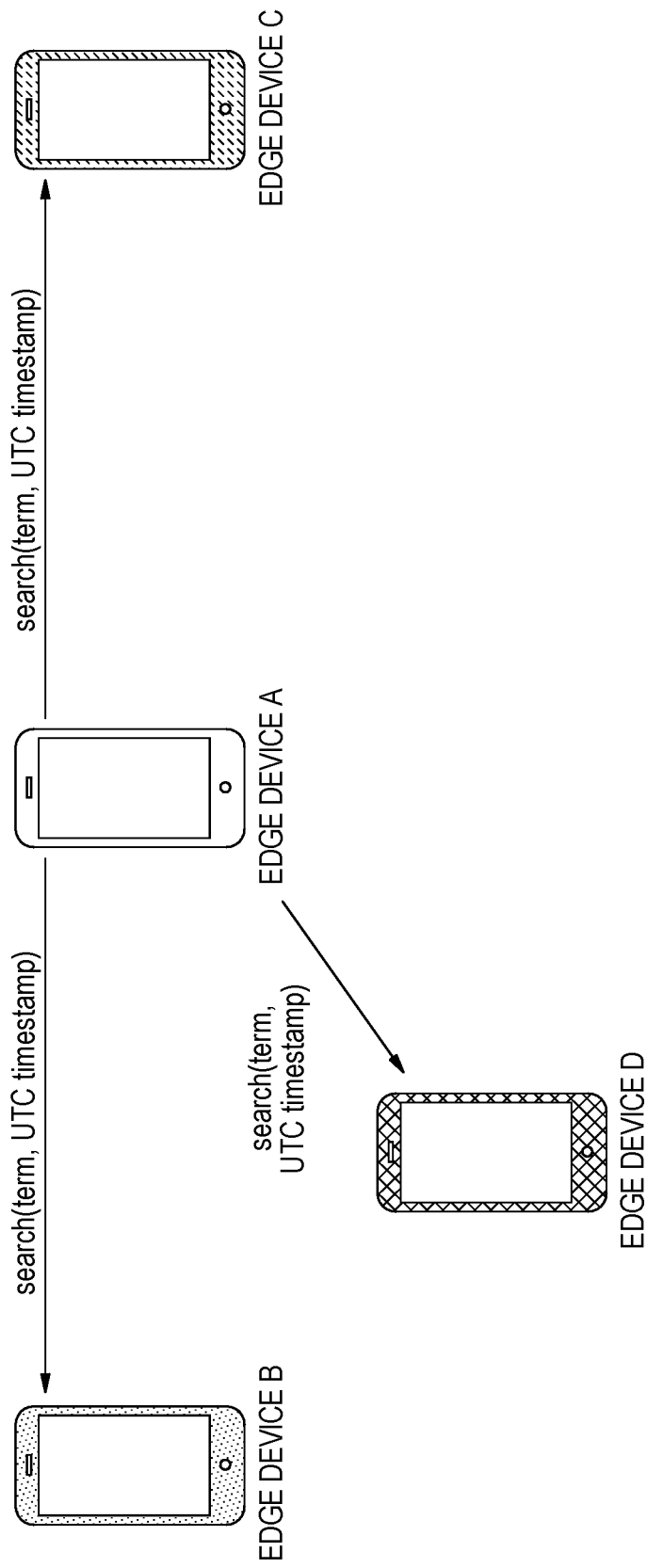
Figure 7C:
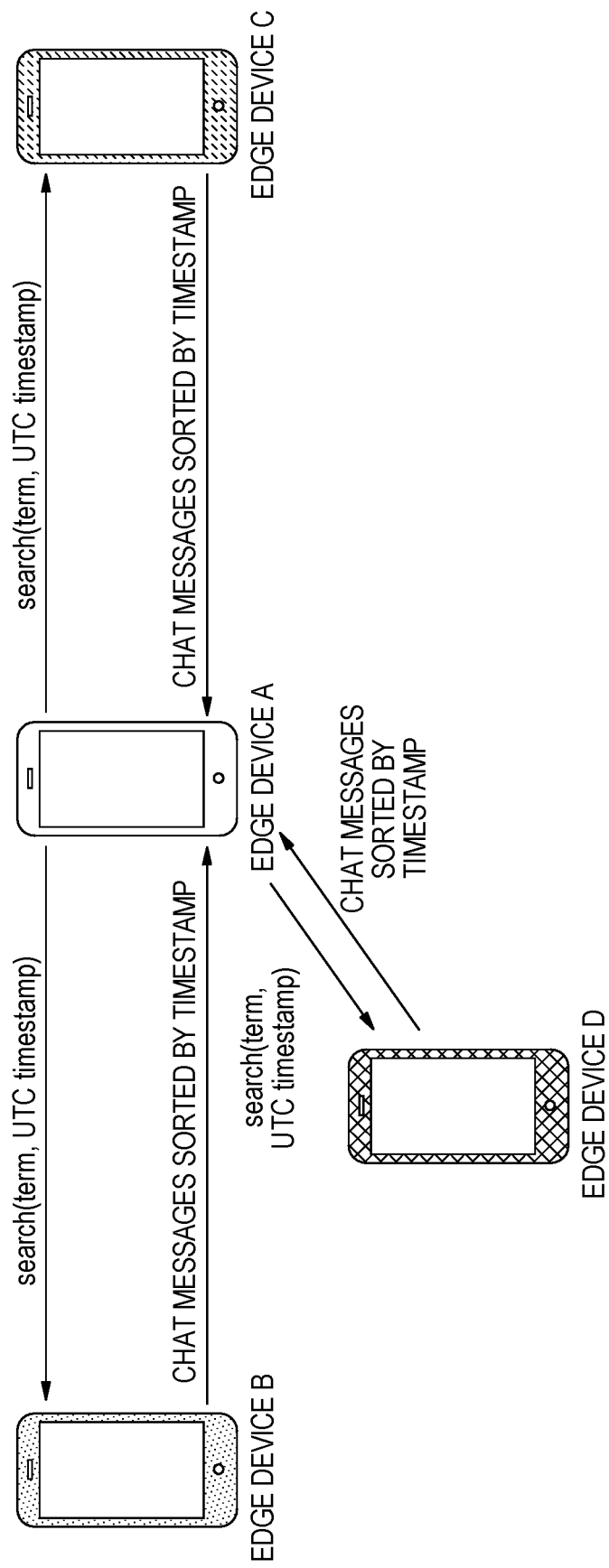

FIGS. 7A-7I depict a further example of a chat message search and restore process, in accordance with one or more aspects of the present invention. In this example, the user's edge device, edge device A, is used within a system such as described above in connection with FIGS. 1 & 4A, where the user is participating in a group chat with multiple other participant edge devices, including edge device B, edge device C, and edge device D, such as described above in connection with FIGS. 4A-6E. As illustrated in FIG. 7A, the locate chat message request is initially a chat message search request from edge device A to selected participant edge devices of a group chat, which in the depicted example, includes edge device B, edge device C and edge device D, by way of example only. As illustrated, in one embodiment, the chat message search request can include at least one search term for searching content of chat messages in the chat, as well as, for instance, a particular timestamp of chat messages in the group chat from which to search the content.

Figure 7D:
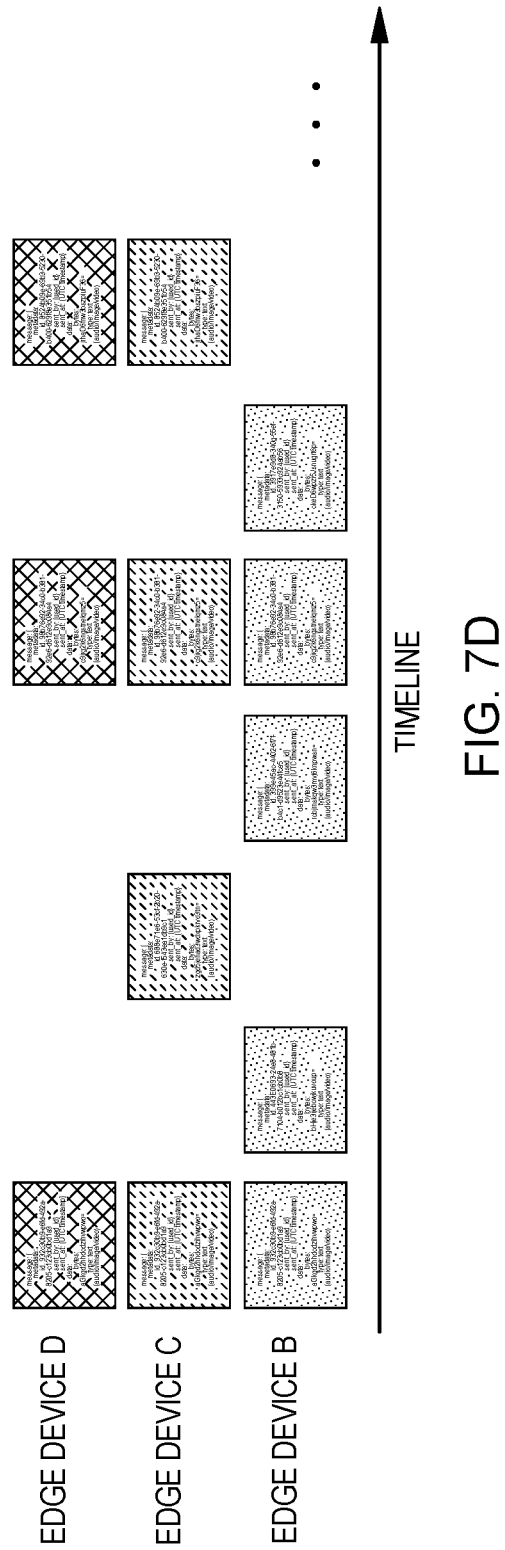

FIG. 7B depicts one example of a chat message search request which includes multiple fields, including metadata fields and data fields. In the example depicted, the metadata can include a message identifier of the chat message search request, a user identifier of a user sending the search request, and a UTC timestamp of the search request. The data field can include, for instance, a search term for searching content of chat messages in the chat at the receiving edge device, as well as, for instance, specifying starting the search from a particular message identifier and/or particular timestamp of chat messages in the group chat, by way of example only. Further, in the depicted chat message search request of FIG. 7B, pagination is provided which includes a page_size parameter, as well as a direction parameter, that is, whether forward or backward, for returning the next or previous x chat messages in the chat. As with the chat message restore request example of FIG. 6B, the chat message search request example of FIG. 7B is one example only of a search request such as disclosed herein. As described above, each receiving edge device does a local search in the group chat for content-relevant results based on the one or more search terms, and returns the relevant results to the requesting edge device, that is, to edge device A in the example of FIG. 7C. Also, note that the returned chat messages can be sorted by timestamp by the returning edge device, in one embodiment. As explained above, the number of chat messages returned can be based on the number of results requested in the chat message search request. An example of returned results is depicted in FIG. 7D, where duplication of chat messages along the timeline is possible, as is with the case of the chat message restore request processing. Again, in the example of FIG. 7D, it is assumed that edge device B, edge device C and edge device D each lack a complete set of the chat messages to be provided to the requesting edge device, which is by way of example only. In one or more other embodiments, any one of the edge devices can have a complete set of chat message results, or each edge device (that is, edge device B, edge device C and edge device D) can have a complete set of the chat message results. De-duplication is performed on the received chat messages at the receiving edge device by, for instance, deleting or discarding extra copies of any returned chat messages of the chat.

Figure 7E:
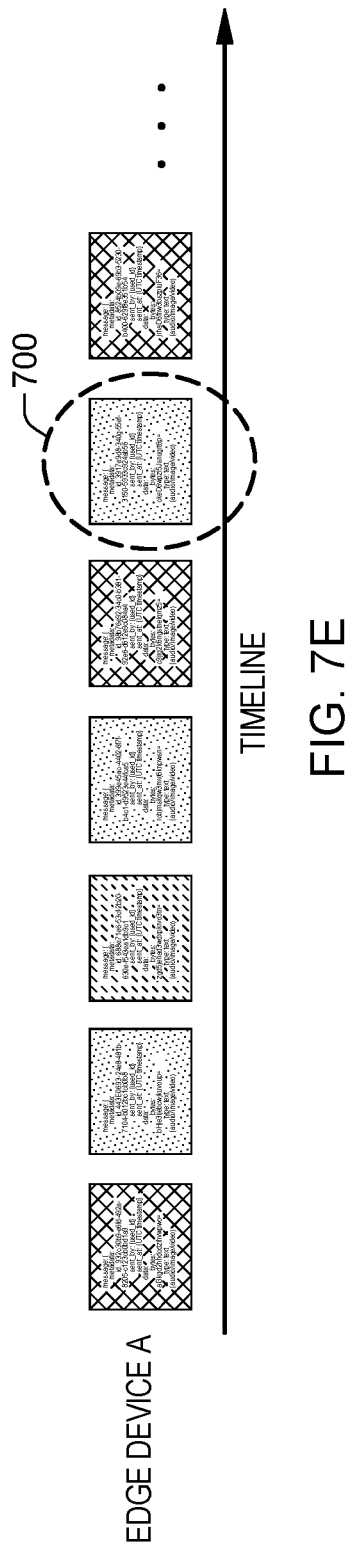
Figure 7F:
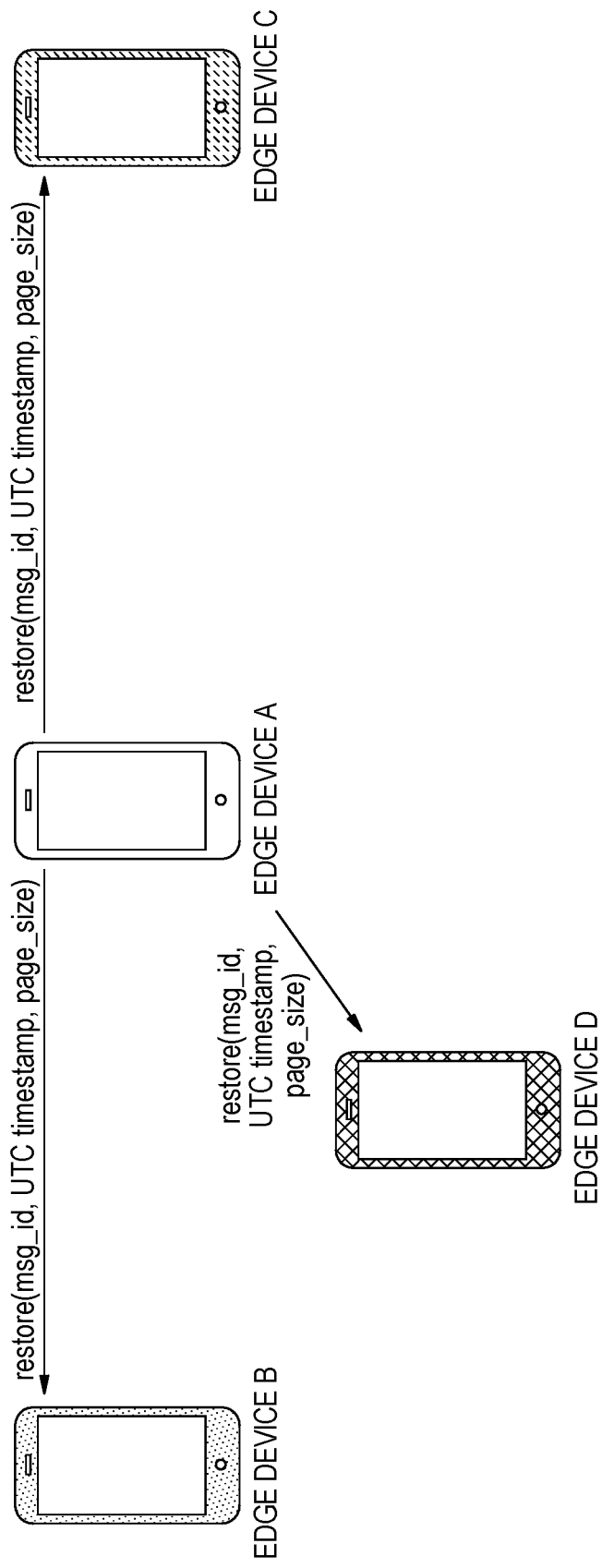
Figure 7G:
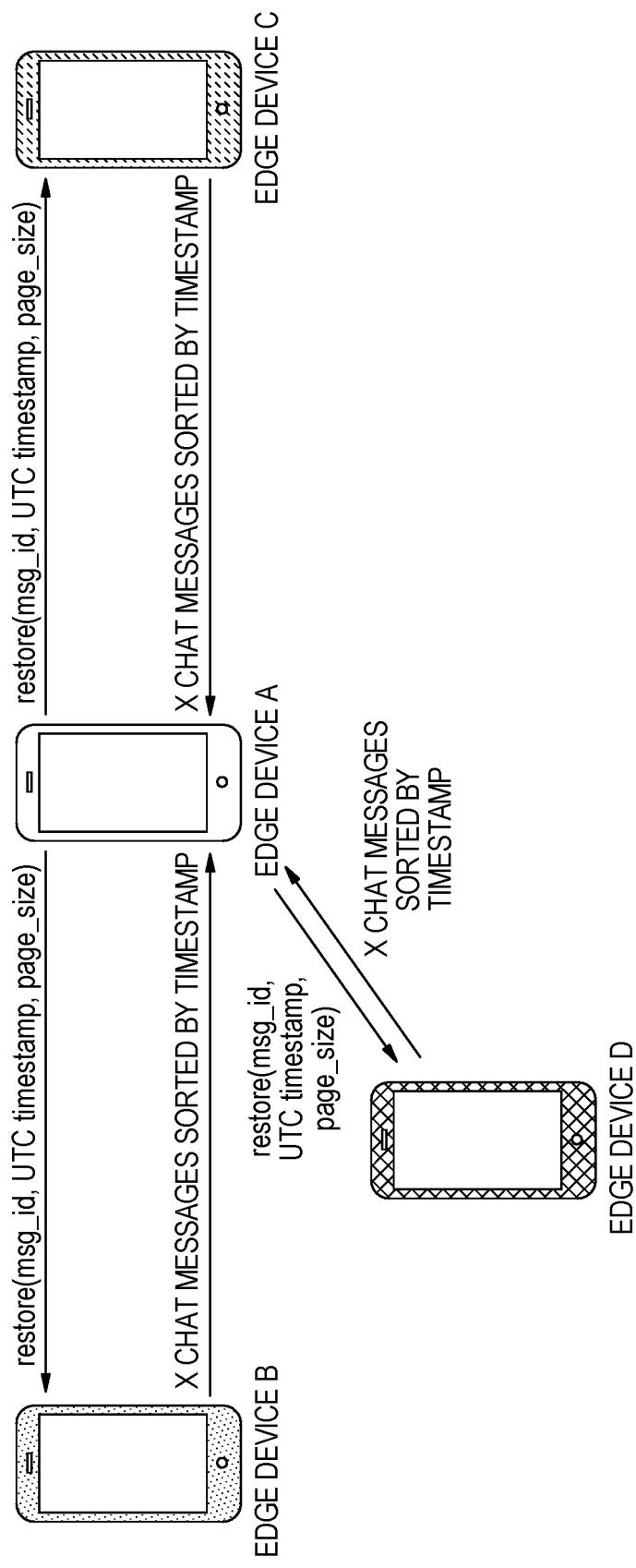
Figure 71:
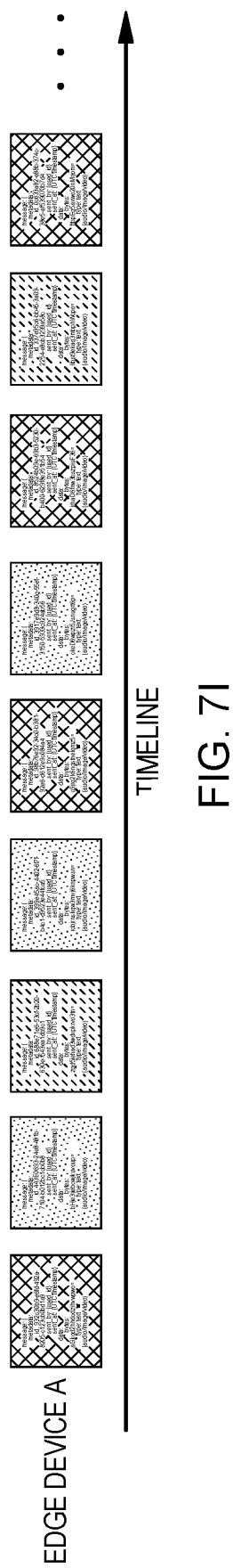

In FIG. 7E, a user has identified a particular chat message 700 as being a chat message of interest. Based on locality principle, and assuming the user is looking for additional content relevant to the identified chat message 700, the locate chat message module processing can include performing chat message restoring with pagination, as illustrated in FIGS. 7F-7I. As illustrated in FIG. 7F, a chat message restore request with, for instance, a message ID to be restored and/or a UTC timestamp of a message to be restored, as well as a page_size as part of a pagination parameter, is sent to multiple participant edge devices, edge device B, edge device C and edge device D in the example. As shown in FIG. 7G, edge device B, edge device C and edge device D each return x messages, again sorted by timestamp (in one example only) to the requesting edge device A, where x is defined, for instance, by the page_size parameter, in one embodiment. The presence of duplicate chat messages is illustrated in FIG. 7H, and after de-duplication or deletion of extra copies of each chat message returned, results in the desired sequence of chat messages in time-sequence order, as illustrated in FIG. 7I, which can be presented by edge device A to the user and/or saved at edge device A.

Advantageously, those skilled in the art will note that disclosed herein are computer-implemented methods, computer systems and computer program products which facilitate processing within a computing environment, and in particular within a messaging system environment, to address the issue of selective search and restoring of missing chat messages in the messaging system, where the messaging system does not store data on a server side of the system. In one or more aspects, the processing includes distributing a locate chat message request to participants in a group chat of the messaging system, and receiving from various edge devices of the participants a copy of the missing chat messages located in the remote edge devices, while respecting privacy of the messages. Further, the process can include sorting the messages on a timeline and performing de-duplication of any duplicate messages, as well as using pagination (i.e., the splitting of results into pages and receiving of results in batches) to facilitate restoring to the edge device the desired missing chat messages of a chat via a messaging system, such as an end-to-end encryption messaging system.

Disclosed herein are solutions where the missing chat messages are not available on the edge device, nor in a backup for the edge device. The locate chat message process disclosed advantageously respects privacy of the data, such as in an end-to-end encrypted messaging system. Further, the concepts disclosed herein allow for enhanced storage and retrieval approaches for heterogenous environments, such as where certain edge devices have greater processing and/or storage capabilities than others. Where a particular edge device is unable to store all chat messages of a chat, or a group of chats, some of the data can be deleted, and later searched or restored on demand using a locate chat message facility and process such as disclosed herein.

As a further advantage, the concepts disclosed can be used in combination with conversational artificial intelligence (AI), such as generative language models, foundation models, and applications. For example, a group of users can temporarily add a generative language bot to answer one or more questions in a specific group chat context. If any of these messages is lost, asking the generative language bot the same question again will not provide the same answer, because the generative language model answers are built on a sequence of questions and answers, and context. The locate chat message facility and processing disclosed herein solves this problem, by allowing the users to extract the same answer that was previously provided related to the specific context, from one or more other user edge devices.

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

The terminology used herein is for the purpose of describing particular embodiments only and is not intended to be limiting of the invention. As used herein, the singular forms "a", "and" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features.

Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
   deleting at least one chat message of a chat in local-based edge device storage of one edge device of a plurality of heterogenous edge devices of an end-to-end encrypted messaging system where message data is storage in local-based edge device storage only, the end-to-end encrypted messaging system providing secure communication of chat messages between the plurality of heterogenous edge devices, and where two or more edge devices of the plurality of heterogenous edge devices have different amounts of local-based edge device storage available for storing chat messages, the one edge device being one edge device of the two or more edge devices, and the deleting is to provide additional storage space in the local-based, edge device storage of the one edge device;
   determining a need for at least one missing chat message of the chat deleted from the local-based, edge device storage of one edge device of the plurality of heterogenous edge devices;
   generating and transmitting a locate chat message request from the one edge device to at least one other edge device of the plurality of heterogenous edge devices, via the end-to-end encryption messaging system, the locate chat message request identifying at least one search parameter for the at least one missing chat message in the local-based, edge device storage of the one edge device, where the at least one other edge device comprises at least one other edge device of the two or more edge devices with different amounts of local-based edge device storage available for storing chat messages; and
   based on transmitting the locate chat message request to the at least one other edge device of the plurality of heterogenous edge devices, receiving at the one edge device from the at least one other edge device, via the end-to-end encrypted messaging system, the at least one missing chat message of the chat identified via the at least one search parameter.

2. The computer-implemented method of claim 1, wherein the locate chat message request comprises a chat message restore request, with the at least one missing chat message identified via the at least one search parameter being at least one missing chat message of the chat to be restored on the one edge device, and wherein the at least one search parameter is at least one metadata attribute of the at least one missing chat message.

3. The computer-implemented method of claim 2, wherein a metadata attribute of the at least one metadata attribute is selected from the group consisting of: a message identifier of the at least one missing chat message, and a message timestamp of the at least one missing chat message.

4. The computer-implemented method of claim 2, wherein the chat message restore request further identifies a pagination parameter, the pagination parameter identifying a maximum number of missing chat messages to be received based on the chat message restore request, and wherein the receiving comprises receiving at the one edge device from the at least one other edge device a maximum of x missing chat messages of the chat, wherein x is identified by the pagination parameter.

5. The computer-implemented method of claim 4, further comprising transmitting a further chat message restore request from the one edge device to the at least one other edge device of the at least one other participant in the chat for a next set of x missing chat messages of the chat.

6. The computer-implemented method of claim 2, wherein the transmitting comprises broadcasting the chat message restore request from the one edge device to multiple other edge devices of multiple other participants in the chat, the at least one other edge device being at least one other edge device of the multiple other edge devices.

7. The computer-implemented method of claim 6, wherein the chat message restore request identifies multiple missing chat messages of the chat to be restored on the one edge device, and wherein the receiving comprises receiving at the one edge device from the multiple other edge devices multiple copies of one or more chat messages of the chat that were missing at the one edge device, where chat messages of the chat received at the one edge device from the multiple other edge devices are sorted by timestamp, and wherein the computer-implemented method further comprises:
  de-duplicating, at the one edge device, duplicate chat messages of the chat received from the multiple other edge devices to obtain de-duplicated chat messages of the chat; and
  presenting by the one edge device the de-duplicated chat messages of the chat to a user.

8. The computer-implemented method of claim 7, wherein the presenting comprises displaying by the one edge device the de-duplicated chat messages reinserted in correct time sequence within the chat.

9. The computer-implemented method of claim 7, wherein the presenting comprises displaying by the one edge device the de-duplicated chat messages in correct time sequence separate from the chat.

10. The computer-implemented method of claim 1, wherein the locate chat message request comprises a chat message search request, and the at least one search parameter comprises at least one search term for searching content of chat messages in the chat, and wherein the at least one missing chat message received at the one edge device contains a content-relevant result based on the at least one search term.

11. The computer system of claim 10, wherein transmitting the chat message search request comprises transmitting the chat message search request from the one edge device to multiple other edge devices of multiple other participants in the chat, and wherein multiple copies of one or more chat messages of the chat are received at the one edge device from the multiple other edge devices and are sorted by timestamp, and the computer-implemented method further comprises:
  de-duplicating, at the one edge device, duplicate chat messages of the chat received from the multiple other edge devices to obtain de-duplicated chat messages of the chat; and
  presenting by the one edge device the de-duplicated chat messages of the chat to a user.

12. A computer system for facilitating processing within a computing environment, the computer system comprising:
  a memory; and
  at least one processor in communication with the memory, wherein the computer system is configured to perform a method, said method comprising:
    deleting at least one chat message of a chat in local-based edge device storage of one edge device of a plurality of heterogenous edge devices of an end-to-end encrypted messaging system where message data is storage in local-based edge device storage only, the end-to-end encrypted messaging system providing secure communication of chat messages between the plurality of heterogenous edge devices, and where two or more edge devices of the plurality of heterogenous edge devices have different amounts of local-based edge device storage available for storing chat messages, the one edge device being one edge device of the two or more edge devices, and the deleting is to provide additional storage space in the local-based, edge device storage of the one edge device;
    determining a need for at least one missing chat message of the chat deleted from the local-based, edge device storage of one edge device of the plurality of heterogenous edge devices;
    generating and transmitting a locate chat message request from the one edge device to at least one other edge device of the plurality of heterogenous edge devices, via the end-to-end encryption messaging system, the locate chat message request identifying at least one search parameter for the at least one missing chat message in the local-based, edge device storage of the one edge device, where the at least one other edge device comprises at least one other edge device of the two or more edge devices with different amounts of local-based edge device storage available for storing chat messages; and
    based on transmitting the locate chat message request to the at least one other edge device of the plurality of heterogenous edge devices, receiving at the one edge device from the at least one other edge device, via the end-to-end encrypted messaging system, the at least one missing chat message of the chat identified via the at least one search parameter.

13. The computer system of claim 12, wherein the locate chat message request comprises a chat message restore request, with the at least one missing chat message identified via the at least one search parameter being at least one missing chat message of the chat to be restored on the one edge device, and the at least one search parameter being at least one metadata attribute of the at least one missing chat message, and wherein a metadata attribute of the at least one metadata attribute is selected from the group consisting of: a message identifier of the at least one missing chat message, and a message timestamp of the at least one missing chat message.

14. The computer system of claim 13, wherein the chat message restore request further identifies a pagination parameter, the pagination parameter identifying a maximum number of missing chat messages to be restored based on the chat message restore request, and wherein the receiving comprises receiving at the one edge device from the at least one other edge device a maximum of x missing chat messages of the chat, wherein x is identified by the pagination parameter.

15. The computer system of claim 13, wherein the transmitting comprises broadcasting the chat message restore request from the one edge device to multiple other edge devices of multiple other participants in the chat, the at least one other edge device being at least one other edge device of the multiple other edge devices, and wherein the chat message restore request identifies multiple missing chat messages of the chat to be restored on the edge device, and the receiving comprises receiving at the one edge device from the multiple other edge devices multiple copies of one or more chat messages of the chat that were missing at the one edge device, where chat messages of the chat received at the one edge device from the multiple other edge devices are sorted by timestamp, and wherein the method further comprises:

de-duplicating, at the one edge device, duplicate chat messages of the chat received from the multiple other edge devices to obtain de-duplicated chat messages of the chat; and presenting by the one edge device the de-duplicated chat messages of the chat to the user.

16. The computer system of claim 15, wherein the presenting comprises displaying by the one edge device the de-duplicated chat messages reinserted in correct time sequence within the chat.

17. The computer system of claim 12, wherein the locate chat message request comprises a chat message search request, and the at least one search parameter comprises at least one search term for searching content of chat messages in the chat, and wherein the at least one missing chat message received at the one edge device contains a content-relevant result based on the at least one search term.

18. The computer system of claim 17, wherein transmitting the chat message search request comprises transmitting the chat message search request from the one edge device to multiple other edge devices of multiple other participants in the chat, and wherein multiple copies of one or more chat messages of the chat are received at the one edge device from the multiple other edge devices and are sorted by timestamp, and the method further comprises:

de-duplicating, at the one edge device, duplicate chat messages of the chat received from the multiple other edge devices to obtain de-duplicated chat messages of the chat; and presenting by the one edge device the de-duplicated chat messages of the chat to a user.

19. A computer program product for facilitating processing within a computing environment, the computer program product comprising:

one or more computer readable storage media and program instructions embodied therewith, the program instructions being readable by a processing circuit to cause the processing circuit to perform a method comprising:

deleting at least one chat message of a chat in local-based edge device storage of one edge device of a plurality of heterogenous edge devices of an end-to-end encrypted messaging system where message data is storage in local-based edge device storage only, the end-to-end encrypted messaging system providing secure communication of chat messages between the plurality of heterogenous edge devices, and where two or more edge devices of the plurality of heterogenous edge devices have different amounts of local-based edge device storage available for storing chat messages, the one edge device being one edge device of the two or more edge devices, and the deleting is to provide additional storage space in the local-based, edge device storage of the one edge device;

determining a need for at least one missing chat message of the chat deleted from the local-based, edge device storage of one edge device of the plurality of heterogenous edge devices;

generating and transmitting a locate chat message request from the one edge device to at least one other edge device of the plurality of heterogenous edge devices, via the end-to-end encryption messaging system, the locate chat message request identifying at least one search parameter for the at least one missing chat message in the local-based, edge device storage of the one edge device, where the at least one other edge device comprises at least one other edge device of the two or more edge devices with different amounts of local-based edge device storage available for storing chat messages; and based on transmitting the locate chat message request to the at least one other edge device of the plurality of heterogenous edge devices, receiving at the one edge device from the at least one other edge device, via the end-to-end encrypted messaging system, the at least one missing chat message of the chat identified via the at least one search parameter.

20. The computer program product of claim 19, wherein the locate chat message request comprises a chat message restore request, with the at least one missing chat message identified via the at least one search parameter being at least one missing chat message of the chat to be restored on the one edge device, and the at least one search parameter being at least one metadata attribute of the at least one missing chat message, and wherein a metadata attribute of the at least one metadata attribute is selected from the group consisting of: a message identifier of the at least one missing chat message, and a message timestamp of the at least one missing chat message.

* * * * *